United States Patent [19]

Gillard et al.

[11] Patent Number: 5,506,687
[45] Date of Patent: Apr. 9, 1996

[54] DIGITAL SIGNAL RECORDING AND/OR REPRODUCING APPARATUS THAT EVENLY DISTRIBUTES FIELD DATA ACROSS TRACKS

[75] Inventors: Clive H. Gillard, Basingstoke; James H. Wilkinson, Tadley; Michael J. Ludgate, Basingstoke; Jonathan M. Soloff, Basingstoke; Rajan Bhandari, Basingstoke; Terence R. Hurley, Bridgend, all of United Kingdom

[73] Assignees: Sony Corporation, Tokyo, Japan; Sony United Kingdom Limited, Middlesex, England

[21] Appl. No.: 286,386

[22] Filed: Aug. 4, 1994

Related U.S. Application Data

[63] Continuation of Ser. No. 76,969, Jun. 16, 1993, abandoned.

[30] Foreign Application Priority Data

Jul. 6, 1992 [GB] United Kingdom .................. 9214299

[51] Int. Cl.⁶ ............................ H04N 9/79; G11B 5/02
[52] U.S. Cl. ................................. 358/310; 360/22
[58] Field of Search .......................... 358/335, 310, 358/342, 314, 327; 360/22, 23, 24, 32, 33.1; 348/384, 388, 420

[56] References Cited

U.S. PATENT DOCUMENTS

| | | |
|---|---|---|
| 4,638,380 | 1/1987 | Wilkinson et al. . |
| 4,910,605 | 3/1990 | Sasaki et al. .................. 358/310 |
| 4,982,282 | 1/1991 | Saito et al. .................. 358/133 |
| 5,177,797 | 1/1993 | Takenaka et al. . |
| 5,237,424 | 8/1993 | Nishino et al. .................. 358/310 |

FOREIGN PATENT DOCUMENTS

| | | |
|---|---|---|
| 0395337 | 10/1990 | European Pat. Off. . |
| 0413570 | 2/1991 | European Pat. Off. . |
| 0468646 | 1/1992 | European Pat. Off. . |
| 0476630 | 3/1992 | European Pat. Off. . |
| 0497058 | 8/1992 | European Pat. Off. . |
| 9118481 | 11/1991 | Germany . |
| 2075792 | 11/1981 | United Kingdom . |
| 2140189 | 11/1984 | United Kingdom . |
| 2199982 | 7/1988 | United Kingdom . |

OTHER PUBLICATIONS

SMPTE Journal vol. 95, No. 10, Oct. 1986, Scarsdale, NY US pp. 1009–1016 Brush 'Video data shuffling for the 4:2:2 DVTR'.

SMPTE Journal vol. 96, No. 12, Dec. 1987, Scarsdale, NY US pp. 1166–1172 XP3665 Wilkinson 'A review of the signal format specification for the 4:2:2 component digital VTR' figures 2,3.

Patent Abstracts of Japan vol. 16, No. 25 (P–1360) 26 May 1992, JP-A-04 047 569 (Canon) 17 Feb. 1992.

*Primary Examiner*—Tommy P. Chin
*Assistant Examiner*—Robert Chevalier
*Attorney, Agent, or Firm*—William S. Frommer; Alvin Sinderbrand

[57] ABSTRACT

A digital video tape recording/playback system having a plurality of recording heads (A, B, C, D) on a rotating head mechanism 94 for recording slanting tracks 108 which extend diagonally across a tape 82 provides processing of video signals in a plurality of data processing channels with selective connection of the data processing channels to the recording heads such that data from a plurality of data processing channels are stored in respective portions of a slanting track (A+/A−; B+/B−; C+/C−; D+/D−). The data in each data processing channel and recorded in each track portion is sampled with a substantially even distribution over a field of video signals to provide for effective concealment of recording/playback errors. Preferably, two data processing channels are recorded on each track, the respective portions being located in upper and lower portions of the tape, respectively.

26 Claims, 14 Drawing Sheets

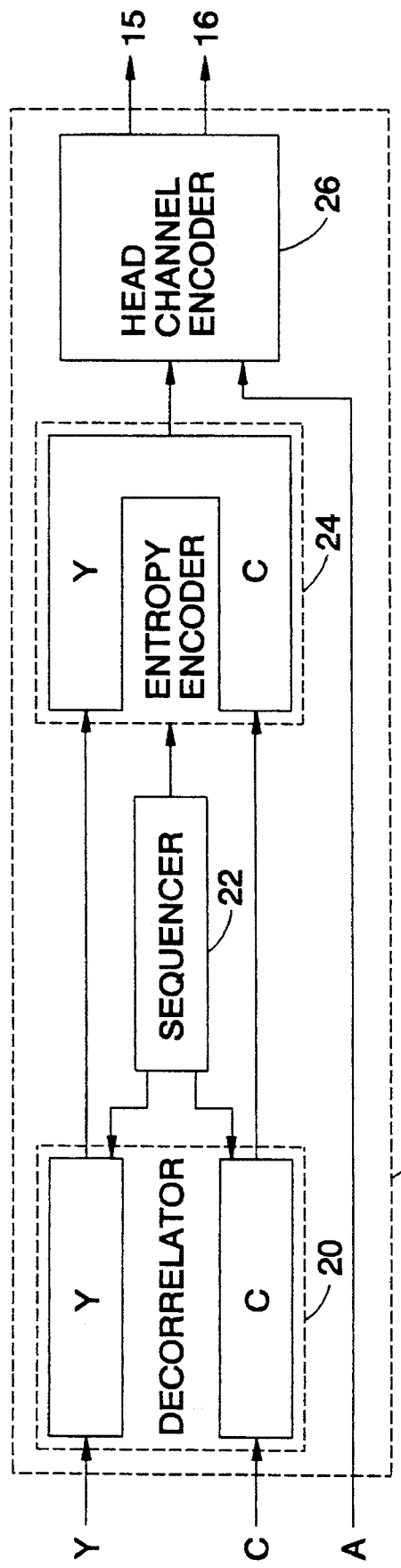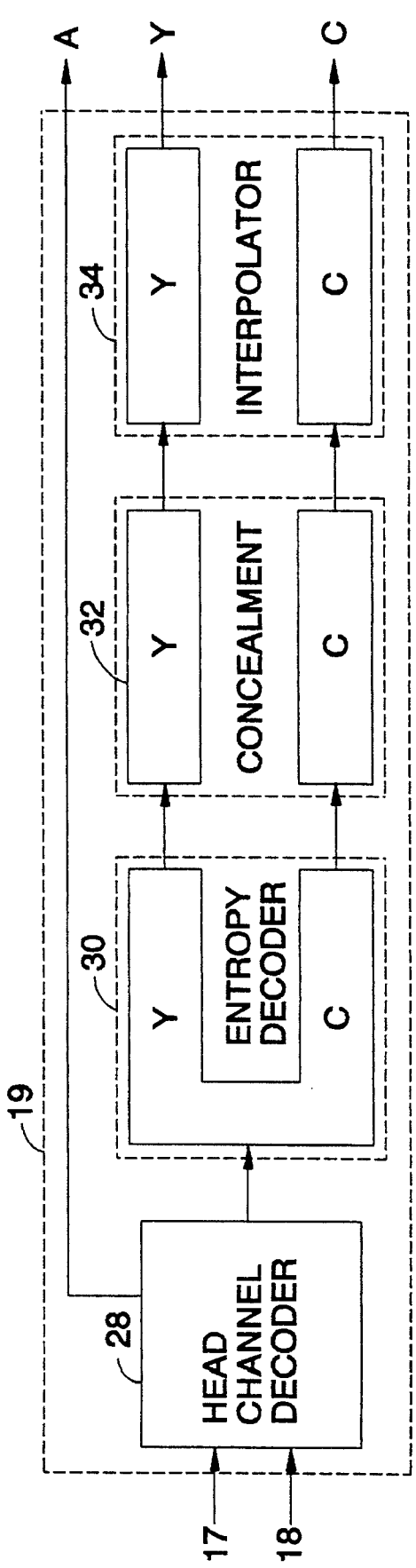

HOR. FREQ ⟶

VERT. FREQ

| 1 | 3 | 8 | 17 | 29 | 39 | 47 | 56 |
| 2 | 5 | 11 | 19 | 30 | 40 | 49 | 57 |
| 4 | 7 | 12 | 21 | 32 | 41 | 50 | 58 |
| 6 | 9 | 15 | 24 | 34 | 43 | 51 | 60 |
| 10 | 13 | 18 | 26 | 36 | 44 | 53 | 61 |
| 14 | 16 | 23 | 31 | 38 | 46 | 54 | 62 |
| 20 | 22 | 27 | 35 | 42 | 48 | 55 | 63 |
| 25 | 28 | 33 | 37 | 45 | 52 | 59 | 64 |

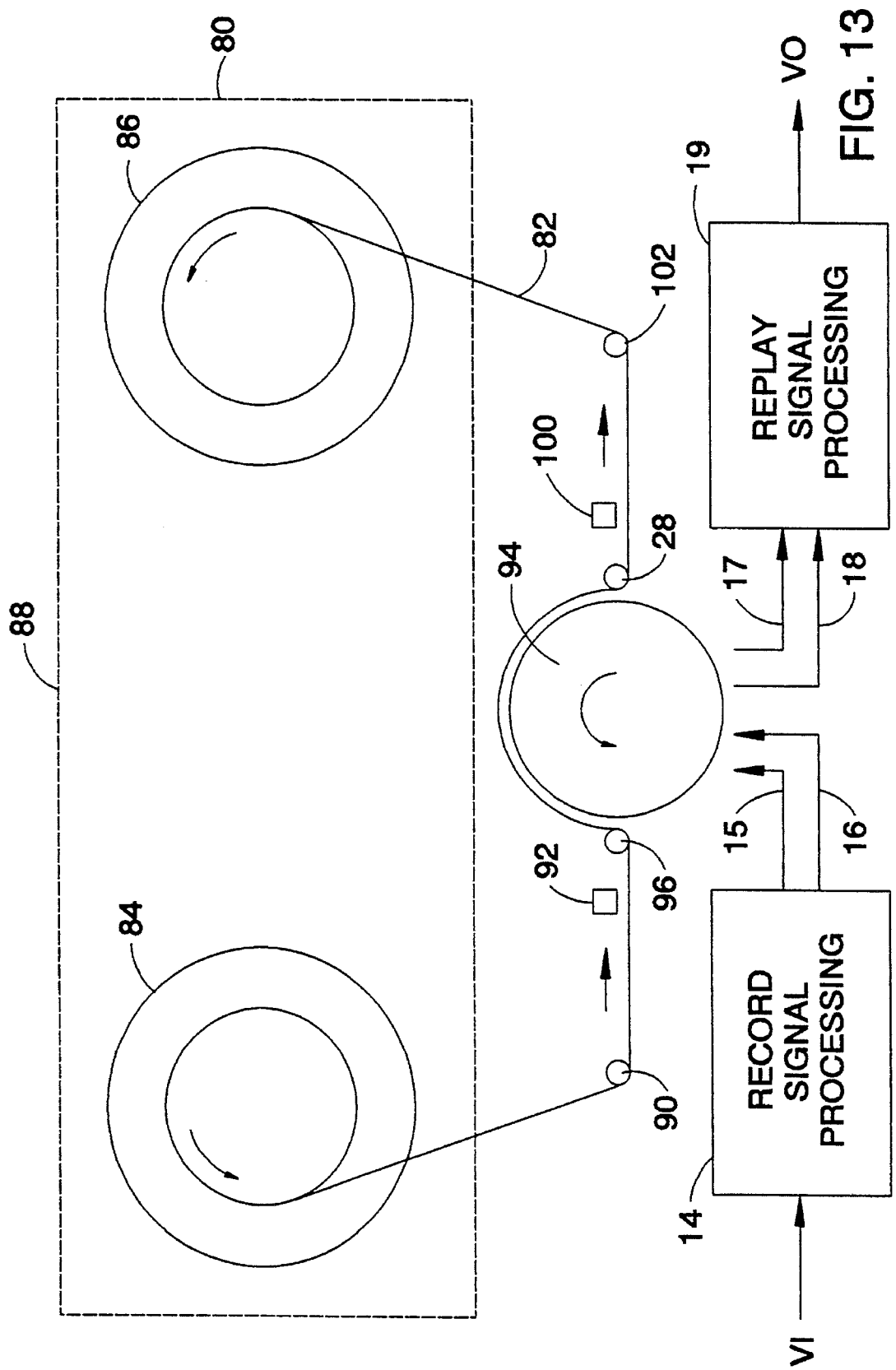

DIGITAL SIGNAL RECORDING AND/OR REPRODUCING APPARATUS THAT EVENLY DISTRIBUTES FIELD DATA ACROSS TRACKS

This application is a continuation of application Ser. No. 08/076,969, filed Jun. 16, 1993 now abandoned.

BACKGROUND OF THE INVENTION

1. Field of the Invention

The invention relates to digital signal processing apparatus, in particular to such apparatus for recording and/or replaying digital image or video signals with a plurality of recording heads on a rotating head mechanism in slanting tracks which extend diagonally across a recording medium such as a tape.

2. Description of the Prior Art

Given the high information densities and stringent requirements under which digital video tape recording systems operate, it is not practical to design systems in which no recording and/or playback errors occur. Typical of the sorts of problems which occur are the loss of data due to a recording or playback head becoming clogged with dirt and/or recording material from the tape, inhomogeneities in the recording layer(s) on the tape and scratches in the tape. Accordingly, known digital video tape recording systems include apparatus and methods for coping with errors which occur during the recording and/or playback of video information as part of the overall operation of such systems.

As a first level of protection against such errors, error correction codes are included with the recorded video data. If the error is a minor one then it is often possible to uniquely identify the particular piece or pieces of information that are in error and what data they should be replaced with. If the error is too severe, then such error correction cannot cope and then reliance is made upon error concealment techniques to reduce the perceivable effect of the error.

In order to facilitate error concealment, it is known to sub-sample the image data into a number of different data processing and recording channels. In this way, if an error occurs in one channel, then there will be data from the remaining channels surrounding the missing data points from the defective channel. For each erroneous pixel, a replacement pixel value can be interpolated from the surrounding pixel values from the other channels within the same field or frame or alternatively from the corresponding pixel position in preceding and/or following video fields or frames. Whilst detail is still lost from the image by such errors, the overall effect of such error concealment is to make the error less immediately perceivable.

An example of digital video tape recorder apparatus employing such an approach to error handling is described in GB-A-2 140 189. In this known apparatus, with a recording head assembly having 2n heads, where n is 1, 2 or 3, a demultiplexer demultiplexes video samples of an incoming digital television signal sample-by-sample into 2n channels for supply to the 2n recording heads and a switching arrangement for switching the connections between the channels and the heads line-by-line and possibly also field-by-field or frame-by-frame of the television signal. Although GB-A-2 140 189 mentions the idea of switching the head allocation field-by-field or frame-by-frame, i.e. a temporal demultiplexing of the video signals, it does not describe a detailed implementation of this. In practice a sample-by-sample, or spatial demultiplexing of the video signals has to date been found sufficient.

GB-A-2 140 189 describes the demultiplexing of video data into four channels for supply to each of four heads A, B, C and D. A stream of video pixels for a video field is received as a stream of pixels, pixel-by-pixel from left to right within a scan line and line-by-line. The demultiplexing is applied in a cyclical manner so that successively received pixels are applied to respective ones of the heads A, B, C and D. To facilitate concealment of errors by providing that each pixel is surrounded by eight pixels not processed by the same head, switching occurs between the heads A and C and between the heads B and D on a line-by-line basis. The result of the demultiplexing operations described in GB-A-2 140 189 is illustrated in FIG. 23. It can be seen that each line of pixels contains the sequence A, B, C, D, A, B, C, D, and so on, with, however, the sequence displaced in alternate lines by two pixel positions within that line. This simple structure always ensures that a pixel is surround by pixels from the other three heads. The demultiplexing strategy described in GB-A-2 140 189 has been found to be satisfactory where digital pixel samples are recorded directly on tape.

However, in view of the high information densities involved in image data processing, particularly as image definition increases, it is desirable that some form of data compression be performed upon the image data before it is recorded. One set of techniques for achieving such data compression involves the transformation of the image data from the spatial domain into the transform domain. Once transformed into the transform domain, the redundancy within the image data can be better exploited to yield efficient compression. The data are stored or transmitted as an encoded version of the image in the transform domain.

However, it has been found that the performance of the concealment strategy of GB-A-2 140 189 can be poor in response to certain types of drop out errors, for example where there is a longitudinal scratch on the tape surface. This can mean that blocks of data on successive tracks are faulty with the result that concealment of the errors is not possible.

SUMMARY OF THE INVENTION

An object of the present invention is therefore to mitigate the problems of the prior art particularly in the case of digital video tape recording/replay systems employing data compression.

In accordance with a first aspect of the invention there is provided a record signal processing apparatus for a digital tape recorder comprising a plurality of recording heads on a rotating head mechanism for recording slanting tracks which extend diagonally across a recording medium, the record processing apparatus comprising means for receiving an input field of digital signals (e.g. video or image signals), means for demultiplexing signals from a field into a plurality of data processing channels such that each data processing channel samples the signals with a substantially even distribution over the field and means for selectively allocating the data processing channels to head channels for the recording heads such that, in use, data from each of a plurality of data processing channels are recorded in a respective portion of a said slanting track.

A record processing apparatus in accordance with the present invention permits the storage of information in a manner which enables improved concealment of errors to be obtained. By arranging for the data to be stored in a portion of a track to be derived from samples from the signal field having a substantially even distribution over that field, concealment of even large errors (e.g. due to a scratch on the tape) is possible.

Preferably, for a transport system for the recording medium with a rotating head mechanism comprising n recording heads, the demultiplexing, or separating means generates 2*n data channels. In other words, two data processing channels are recorded on each track. Preferably, in this case, the first and second portions are located in upper and lower portions of the recording medium, respectively.

In a preferred embodiment of the invention n=4. In other words there are four record/playback heads and eight data processing channels. A field of image (e.g. video) signals is recorded in four tracks in the preferred embodiment of the invention.

The apparatus preferably comprises decorrelation means for decorrelating an input field of video signals to generate a field of decorrelated video signals, the demultiplexing means being connected to the decorrelation means whereby the demultiplexing means demultiplexes the field of decorrelated video signals into a plurality of data processing channels such that each data processing channel samples the signals with a substantially even distribution over said field. In the preferred embodiment of the invention the plurality of data processing channels are processed in time-multiplexed manner by common hardware.

In a preferred embodiment of the invention digital video signals are recorded in compressed form on the recording medium. The allocation on a data processing channel to head sub-track basis means that the operation of the compression algorithm is not impaired and effective concealment is possible with the storage of compressed data. However, the invention is not limited to applications where video data are stored in compressed form.

For compressing the demultiplexed video field, the apparatus preferably comprises compression means including means for quantising the decorrelated video signals and entropy encoding means for entropy encoding the quantised signals. The quantising of the decorrelated video data helps to improve the efficiency of data compression. The entropy encoding means preferably comprises means for performing run-length encoding of the quantised signals and Huffman encoding means for further encoding the run-length encoded data using Huffman codes.

The entropy encoding means preferably formats the compressed data into equally sized blocks to facilitate storage of the data and appends block coding information to each block to facilitate subsequent decoding of the content thereof, and address information for locating each block within the non-compressed field of decorrelated video signals.

In the preferred embodiment of the invention separate hardware channels are provided for processing luminance and chrominance signals with the entropy encoding means comprising means for combining luminance and chrominance data in each block.

Preferably also, error correction encoding means are provided for applying error correction codes to the blocks of data, the error correction encoding means processing a plurality of blocks as an array of blocks and deriving error correction codes for each of two dimensions of said array.

In the preferred embodiment of the invention the error correction encoding means and the allocating means form part of a head channel encoding means, the head channel encoding means applying synchronisation signals and block identification codes to blocks prior to the recording thereof. The allocating means supplies blocks for first and second data channels to a recording head at respective timings whereby the blocks for the first and second data channels are recorded in the first and second portions of the tape respectively. The allocating means also reallocates the data processing channels to the heads for successive fields of a repeating multi-field sequence.

The invention also provides a replay processing apparatus for a digital player comprising a plurality of playback heads on a rotating head mechanism for replaying a recording medium having tracks which extend diagonally across the recording medium as recorded by apparatus as defined above, the replay processing apparatus comprising channel decoding means for processing data replayed from a plurality of portions of a slanting track by a head and received from a head channel connected, in use, to the head as separate, respective, data processing channels and means for multiplexing the data from the respective data processing channels to generate a signal field (e.g a field of video or image signals) such that data from a said portion of a track as processed by a data processing channel generates samples with a substantially even distribution over said field.

The channel decoding means preferably effects error correction, where possible, for a block of data replayed from the tape using the error correcting information associated therewith and generates an error signal for a block where error correction for that block is unsuccessful. Preferably, the channel decoding means comprises replay storage means, means responsive to block identification information associated with each block to address locations in the replay storage for the storage of the data for that block and temporal multiplexing logic for selecting the data for respective data processing channels from the replay storage. In the preferred embodiment of the invention no data is stored in the replay storage means for a block for which an error signal is generated by the channel decoding means.

In order to be able to decompress compressed data from tape, the apparatus comprises means connected to the head channel decoding means for decompressing the data replayed from the tape in respective data processing channels and for subsequently merging the decompressed data from the data processing channels. Preferably the decompressing means decompresses the content of each block for which no error signal is generated by the channel decoding means using coding information associated with that block and stores resulting, decompressed signal samples in at least one buffer using address information associated with that block.

Preferably no data is updated in the buffer for data blocks for which error correction could not be performed by the head channel decoding means and wherein the decompressing means comprises means for monitoring the updating of the buffer. This provides a ready mechanism for identifying which samples need to be concealed. Accordingly, concealment means are preferably provided which are responsive to the monitoring means for concealing signal samples at a position in the buffer which was not updated as a function of the signal samples surrounding the position in time and/or space.

Preferably, in an embodiment of the invention where the data is representative of image or video signals, the entropy decoding means separates chrominance and luminance signals from the replayed data and the chrominance and luminance information are processed by separate hardware channels.

The invention also provides a digital video processing apparatus comprising a record processing apparatus and a replay processing apparatus as defined above.

The invention further provides a digital video tape record/playback apparatus comprising a tape transport including a plurality of playback heads on a rotating head mechanism for recording and/or replaying a tape having tracks which extend diagonally across the tape and record processing apparatus and/or replay processing apparatus as defined above.

A digital video tape recording system having four heads which enables data to be distributed in a spatial and temporally multiplexed manner has been proposed in which a picture is segmented and then shuffled for storage on tape. In particular, a field of data is segmented into 6 horizontal strips. The data for each of the segments is then recorded on four tracks on the tape. The data for each of the tracks is demultiplexed four ways and each demultiplexed channel is directed to one of the heads. A shuffle function is used to distribute data between a top and a bottom portion of the tracks. The demultiplexed channels are not stored directly on the tape, as the order of the data in the demultiplexed channel is pseudo-randomised to distribute errors throughout the picture to improve concealment. This prior proposal was not, however, designed for the recording of decorrelated and/or compressed video data. In particular, the segmentation of the image means that each sub-track contains data derived from only a limited area (1/6th) of the image so that the possibilities for correction are limited. Also, the shuffling function means that compression is not practical. A single error in a stream of compressed data could cause all the following data to be decoded incorrectly until some re-synchronisation could be performed.

BRIEF DESCRIPTION OF THE DRAWINGS

FIG. 2 is a schematic block diagram of a record processing apparatus of the system of FIG. 1;

FIG. 3 is a schematic block diagram of replay processing apparatus of the system of FIG. 1;

FIG. 13 is a schematic block diagram of a tape transport of the system of FIG. 1;

DESCRIPTION OF THE PREFERRED EMBODIMENTS

Figure 1:
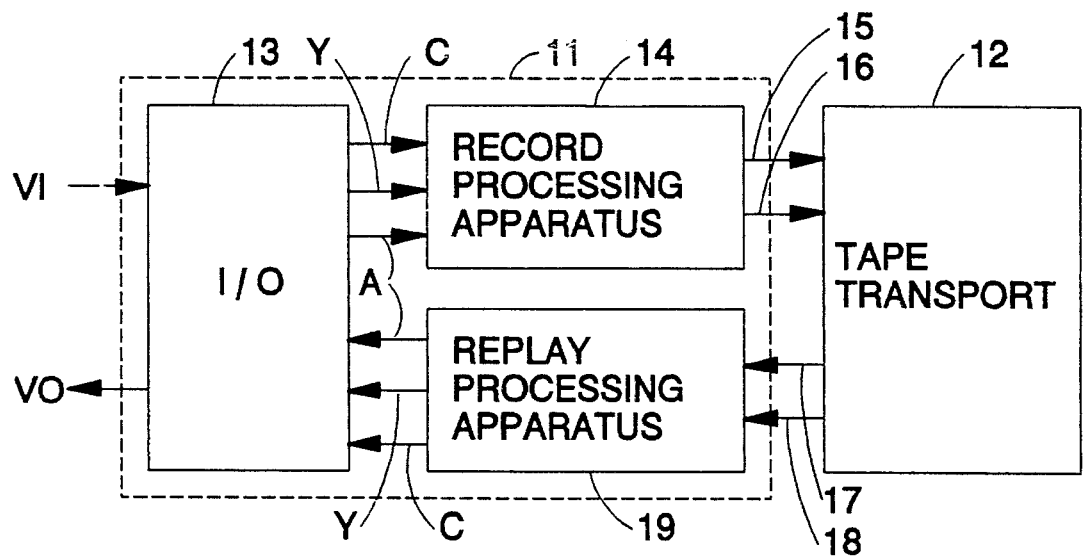
FIG. 1 is a schematic block diagram of a digital video tape system.

FIG. 1 is a schematic overview of digital video tape recording apparatus 10. The digital video tape recording apparatus 10 includes a digital video processing apparatus 11 and a tape transport 12. The tape transport includes a rotating head mechanism with four heads A, B, C, D connected in two pairs A/C and B/D. The digital processing apparatus includes input/output apparatus 13 for receiving digital video input signals VI, for example from a camera after being processed through an analogue-to-digital converter, and to provide digital video output signals from an output V0 to, for example, a video monitor including digital-to-analogue processing circuitry. The input and output digital video signals typically comprise multi-bit (for example 8 bit) samples or words, each representing a respective pixel of a scanned image or picture. The input signals are separated, where necessary, into luminance and chrominance signals in the I/O circuitry 13. The luminance "Y", chrominance "C" and audio signals "A" are supplied to record processing apparatus 14. At this point it should be explained that the chrominance signals C are composed of two colour difference signals, B-Y and R-Y. The colour difference signals output from the I/O circuitry are multiplexed in accordance with a format such that, if B-Y=Cb and R-Y=Cr, then the format is CbCrCbCrCbCrCbCrCbCrCbCrCb-CrCbCr . . . along each line of video. The luminance, chrominance and audio signals are processed and then combined in the record processing circuitry 14. The processed signals are then passed to the tape transport 12 via head channel 15 to heads A and C and via head channel 16 to heads B and D. Replay signals read from the heads A and C are passed via head channel 17 and replay signals from heads B and D are passed via head channel 18 to replay processing apparatus 20 for processing. Luminance "Y", chrominance "C" and audio "A" signals are separated and processed before being passed to the I/O circuitry 13 to form the output digital image signals V0. The output signal V0 can be in the form of separate audio and video signals.

An overview of the processing of the signals for recording and replay will now be given with reference to FIGS. 2 and 3, which are schematic block diagrams of the record processing apparatus 14 and replay processing apparatus 19, respectively. Further details of the structure and operation of the various elements of the record processing apparatus and the replay processing apparatus will then be given.

FIG. 2 is a schematic block diagram showing an example of the record processing apparatus 14 of FIG. 1. The digital video samples (Y,C) from the I/O apparatus 13 are supplied to a decorrelator 22 which generates the frequency separated video signal transferring the spatial pixel samples to samples in a transform domain. Separate hardware channels for the chrominance and luminance signals are provided. A data sequencer 22 controls the output of the decorrelated video signal from the decorrelator so as to generate eight time-multiplexed data processing channels. The eight channels of decorrelated data are passed in time-multiplexed manner to an entropy encoder 24 which compresses the decorrelated video signals. In the entropy encoder the luminance and chrominance signals are combined for recording purposes. A head channel encoder 26 merges the audio data with the video data to form blocks of data to be recorded. The blocks of data include the compressed data samples and identification information for enabling the decoding of the recorded information. The head channel encoder also applies error correction codes to the blocks and allocates the blocks to the two head channels 15 and 16 for recording on tape.

FIG. 3 is a schematic block diagram of an example of the replay processing apparatus 19 of FIG. 1. During replay, recorded signals from the tape are supplied from the tape transport 14 to a channel decoder 28 which carries out initial channel decoding and error correction functions using the error correction and identification information from the recorded blocks of data. The head channel decoder 28 separates the audio signals "A" from the blocks of data stored on the tape and passes the video signals from those blocks to an entropy decoder 30. Errors which could not be corrected by the head channel decoder 28 are flagged. The entropy decoder 30 separates luminance "Y" and chrominance "C" signals from the blocks of data retrieved from tape into separate hardware channels and expands the compressed data. The decompressed data is then passed to a concealment processor 32. The concealment processor 32 covers up, or conceals tape reading errors which could not be corrected by the head channel decoder 28. The output of the concealment processor is then passed to an interpolator or correlator 34 to reconstitute the luminance "Y" and chrominance "C" signals to be passed to the I/O apparatus 13 of FIG. 1 for output.

The structure and operation of the various elements of the record processing apparatus 14 will now be described in more detail.

The decorrelation operation performed by the decorrelator 20 relies on the fact that neighbouring pixels of an image are highly correlated, whereby processing an image (for example a field or frame of a video signal) to form frequency separated signal portions representing different components of the image in the two dimensional spatial frequency domain enables a reduction in the amount of information needed to represent the image. Specifically, the frequency separated signal portions represent different spatial frequency components of the image.

Various decorrelation techniques could be used for the decorrelator 20. One suitable form of decorrelation would be so called transform coding, in particular the discrete cosine transform. The use of discrete cosine transform for decorrelation is prescribed in a version of a compression system described in a standard proposed by the Joint Photographic Experts Group and currently under review by the International Standards Organization. According to the transform technique of decorrelation, the signal is subjected to a linear transform (decorrelation) operation prior to quantisation and encoding.

In the present case, however, an approach to decorrelation based on sub-band coding is used. Accordingly, the decorrelator 20 in the system of FIG. 1 comprises a spatial (2-dimensional) sub-band filtering arrangement which divides the input video signal into a plurality of uncorrelated sub-bands each containing the spatial frequency of the content of the image in respect of one of a plurality of areas of a two-dimensional frequency plane of the image. Decorrelation is achieved by putting the energy of the overall image into different sub-bands of a two-dimensional spatial frequency domain. Sub-band filtering is believed to provide better decorrelation than the transform approach.

Figure 4:
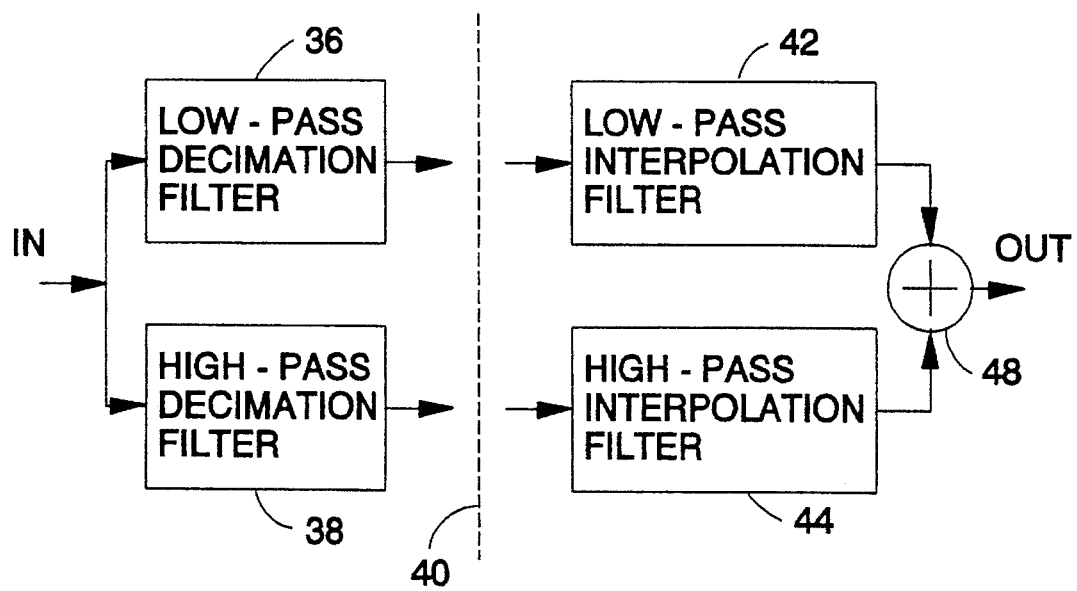
FIG. 4 is a schematic block diagram illustrating sub-band coding.
Figure 5:
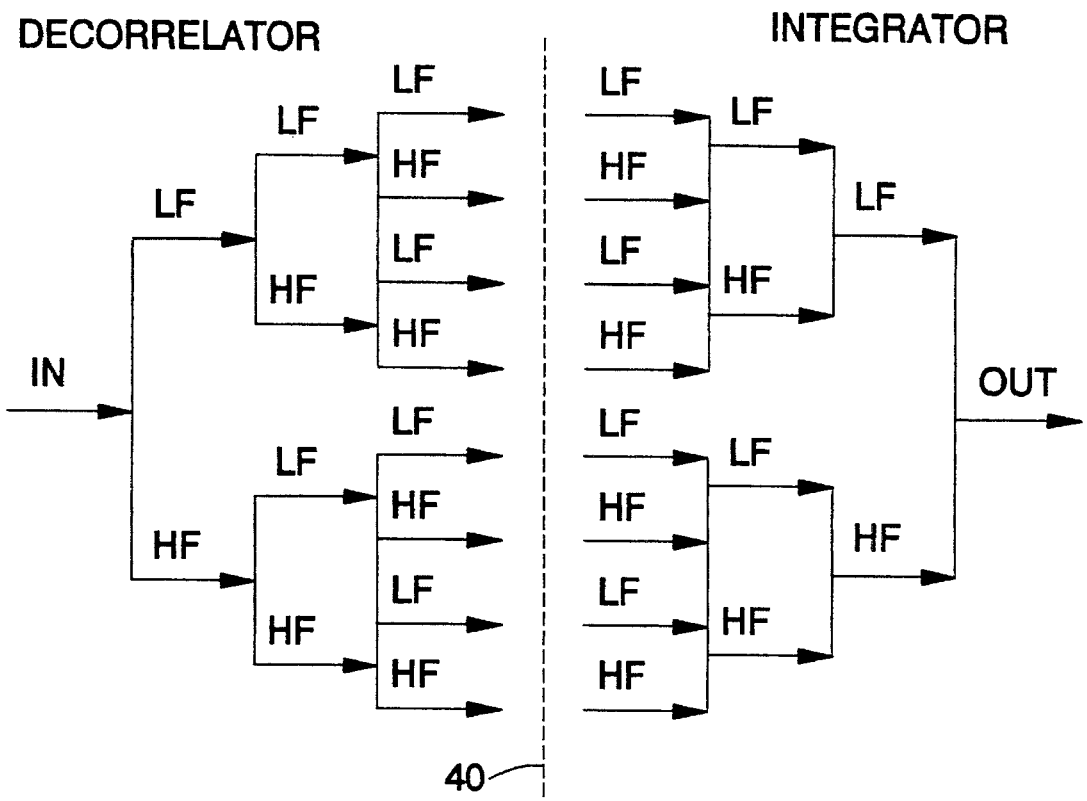
FIG. 5 is a schematic diagram of multiple stage sub-band coding.

FIG. 4 illustrates the principle of sub-band coding in which the input video signal is passed through a low-pass decimation filter 36 and a high-pass decimation filter 38. The resulting two output signals represent different portions of the frequency spectrum of the input signal. The two signals can then be processed further for storage as indicated by the dashed line 40 in FIG. 4. When the sub-band components are recovered from the recording medium they are passed through corresponding matching filters to regenerate the original frequency components. These matching filters are a low-pass interpolation filter 42 and a high-pass interpolation filter 44. The outputs of the interpolation filters 42, 44 are added by a summation circuit 48 to yield the original video input signal. FIG. 4 illustrates the decomposition of the input video signal into two sub-bands. In practice, the input video signal would be decomposed into many more sub-band components. FIG. 5 illustrates the decomposition of an input signal into eight sub-band components and its subsequent recombination into an output video signal. LF indicates a low-pass decimation or interpolation filter (as appropriate left or right, respectively, of the dashed line 40) and HF indicates a high pass decimation or interpolation filter (as appropriate left or right, respectively, of the dashed line 40).

Figure 6:
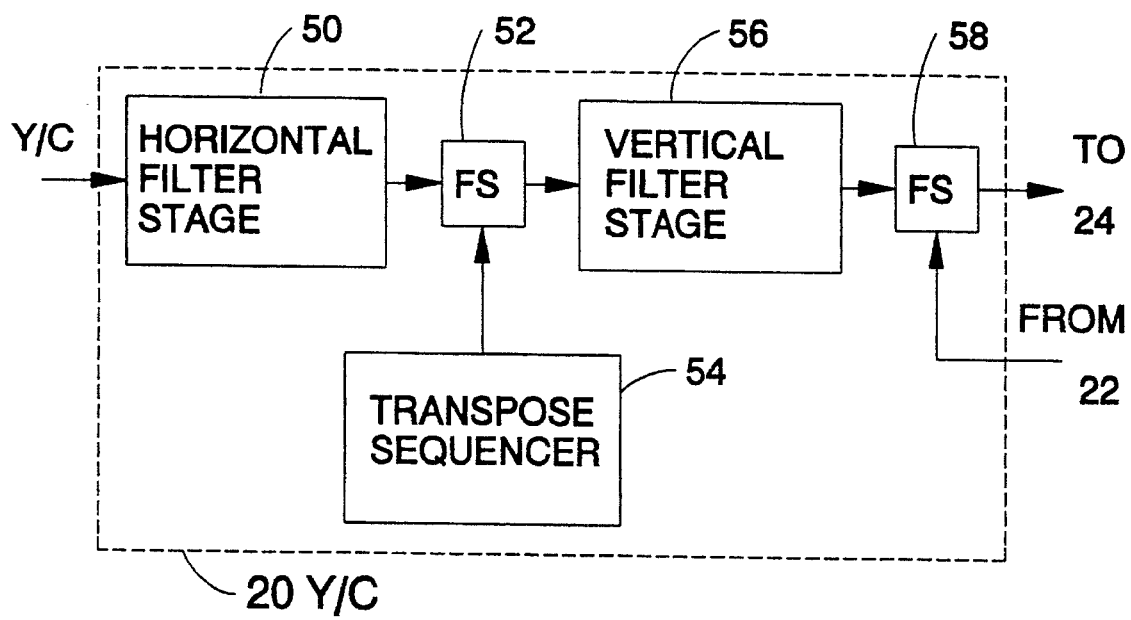
FIG. 6 is a schematic block diagram of a decorrelator of the apparatus of FIG. 2.

FIG. 6 illustrates a decorrelator 20 Y/C which is suitable for processing the luminance or chrominance signals. The decorrelator comprises a horizontal filter stage 50, an intermediate field store 52, a transpose sequencer (address generator) 54, a vertical filter stage 56 and an output field store 58. Sub-band filtering is effected on a separable basis. Thus, in FIG. 6, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 50 and 56, respectively. It will be appreciated that FIG. 6 shows a decorrelator for decorrelating either the luminance "Y" or the chrominance "C" signals. To process both these signals in parallel, a second decorrelator of similar construction to that shown in FIG. 6 is needed.

The horizontal filter arrangement 66 and vertical filter arrangement 72 can be of substantially the same construction as one another, that is a tree or hierarchical structure as shown on the left side of the dashed line 40 in FIG. 5, comprising three successive filter stages. There follows a brief description of the operation of the decorrelator 20 Y/C.

In operation, the horizontal filter stage 50 processes the pixels of an input video field line-by-line and, within each line, pixel by pixel. Successive lines of data output by the eight outputs of third stage of the horizontal filter stage 50 are passed to the intermediate field store 52 and are stored at positions corresponding to respective one-eighths of those lines. This results in the intermediate field store 52 containing a version of the field of the input digital video signal that has been filtered into eight sub-bands in the horizontal direction (only). Each line of the field stored in the intermediate field store 52 is divided into eight portions each containing the horizontal spatial frequency information in a respective one of eight sub-bands of the horizontal spatial frequency range of the image that the original field represented. Thus, the horizontally filtered field stored in the intermediate field store 68 can be considered to be divided into eight columns.

The horizontally filtered field stored in the intermediate field store 52 is then fed (under the control of the transpose sequencer 54) into the vertical filter stage 56, in which it is filtered into eight sub-bands in the vertical direction in similar manner to that in which filtering into eight sub-bands in the horizontal direction was achieved in the horizontal filter stage 50. The horizontally and vertically filtered field is fed on a line-by-line basis into the output field store 58. The store 58 can be considered to have been partitioned into an array of 64 (8×8) storage regions, in each of which a respective one of the 64 sub-bands is stored. The data relating to each of the sub-bands is referred to as a sub-picture. Thus, there are 64 sub-pictures for each field of input video.

Figures 7, 8:
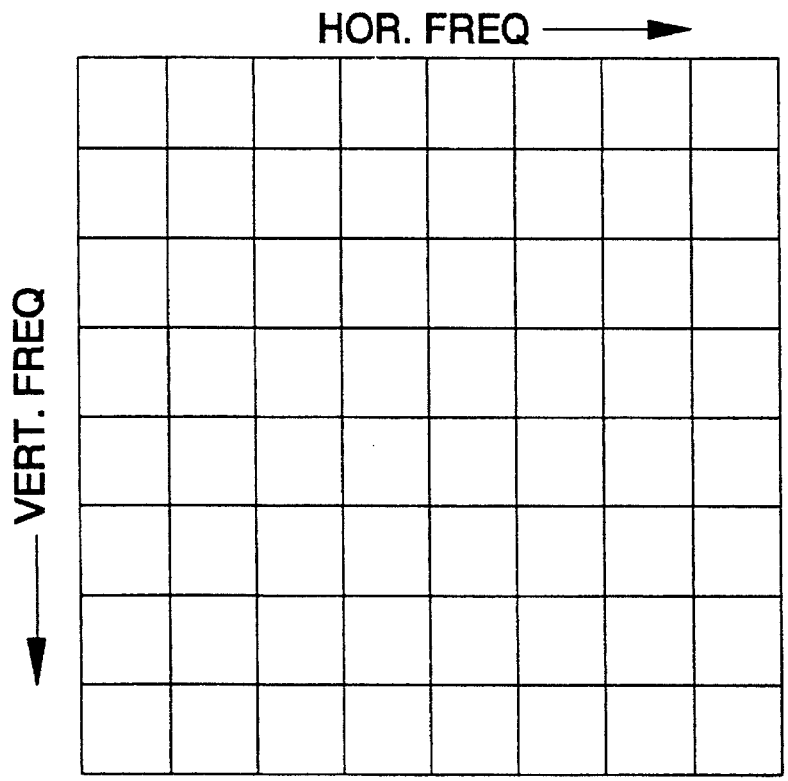
FIG. 7 illustrates the sub-pictures which result from sub-band coding.
FIG. 8 illustrates a scheduling operation performed by a scheduler of the apparatus of FIG. 2.

FIG. 7 represents the array of 64 sub-pictures for the respective sub-bands. The arrows to the top and the left of the array represent, respectively, the direction of increasing frequency of the sub-bands as a result of the repeated decimation by the pairs of low and high frequency filters. The nature of the filtering produced by the combination of the horizontal and vertical filter stages 50 and 56 is such that data stored in the output field store 58 is somewhat scrambled as a result of the frequency inversion which takes place in each pair of low- and high-pass filters. The data sequencer 22 "descrambles" (i.e. re-orders) the data before being passed for further processing by selective addressing of the field store 58.

The data sequencer 22 comprises addressing logic for accessing the samples in the output field store 58 in each of the luminance "Y" and chrominance "C" decorrelators 20. FIG. 8 shows the basic scanning pattern imposed by the data sequencer 22 of FIG. 2 on both the field store for the luminance signals and the field store for the chrominance signals. In other words, the data sequencer accesses sub-pictures 1, 2, 3 ... etc in that order. The data sequencer must track both the luminance and the chrominance signals in the same order as the chrominance and luminance data fop respective portions of the video field are stored in respective data blocks on tape.

Figure 9:
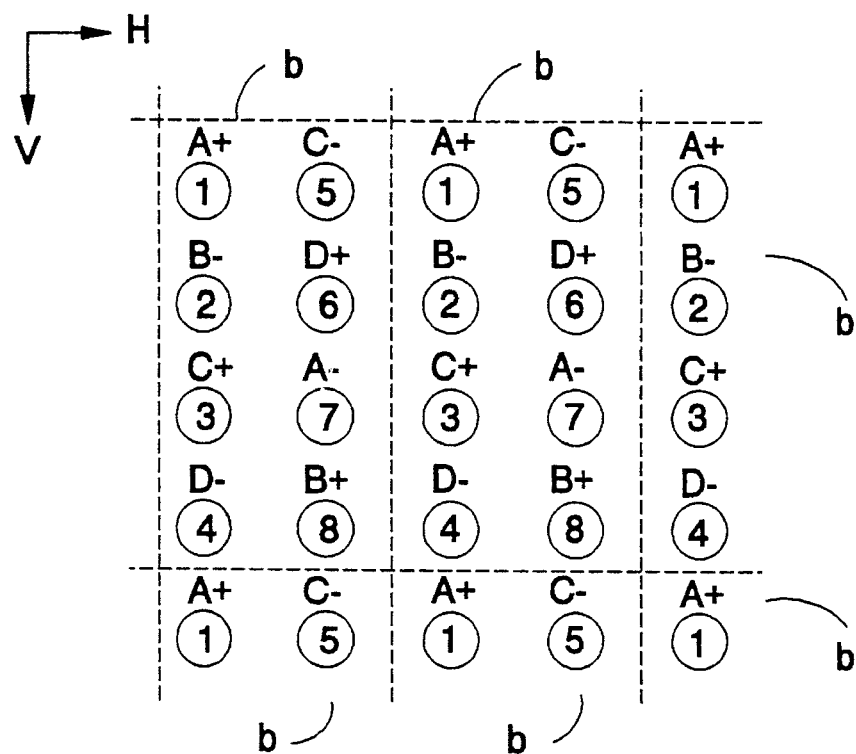
FIG. 9 illustrates a further scheduling operation performed by the scheduler in order to generate eight separate data channels.

In addition to the basic scanning pattern indicated in FIG. 8, the data sequencer 22 additionally separates of demultiplexes the data into eight data processing channels. In particular, the data sequencer scans the sub-pictures in the order indicated in FIG. 8, a total of eight times for each field stored therein. On each scan of the stored data different pixel samples are read so that after the eighth scan all the pixel samples of each sub-pixel have been read. In the preferred embodiment every second pixel on every fourth line is selected for each channel as indicated in FIG. 9, which represents the top left corner of the top left sub-picture. The eight data processing channels are labelled A+, A−, B+, B−, C+, C−, D+, D− for reasons which will be explained later. Thus for data processing channel A+, pixel samples 1, 3, 5 .... on lines 1, 5, 9 .... are selected, for data processing channel A− pixels 2, 4, 6, ... on lines 3, 7, 11, ... are selected, and so on as indicated in FIG. 9.

In the present embodiment each of the eight data processing channels is processed in a time-multiplexed manner, although it will be appreciated that it could be processed by separate hardware channels. Thus the data for the respective data processing channels is supplied in respective time slots to the entropy encoder 24 for further processing. The sequencer also supplies signals "SB" to the entropy encoder 24 indicating the sub-picture (sub-band) to which the samples currently output from the output field stopes 58 relate.

Figure 10:
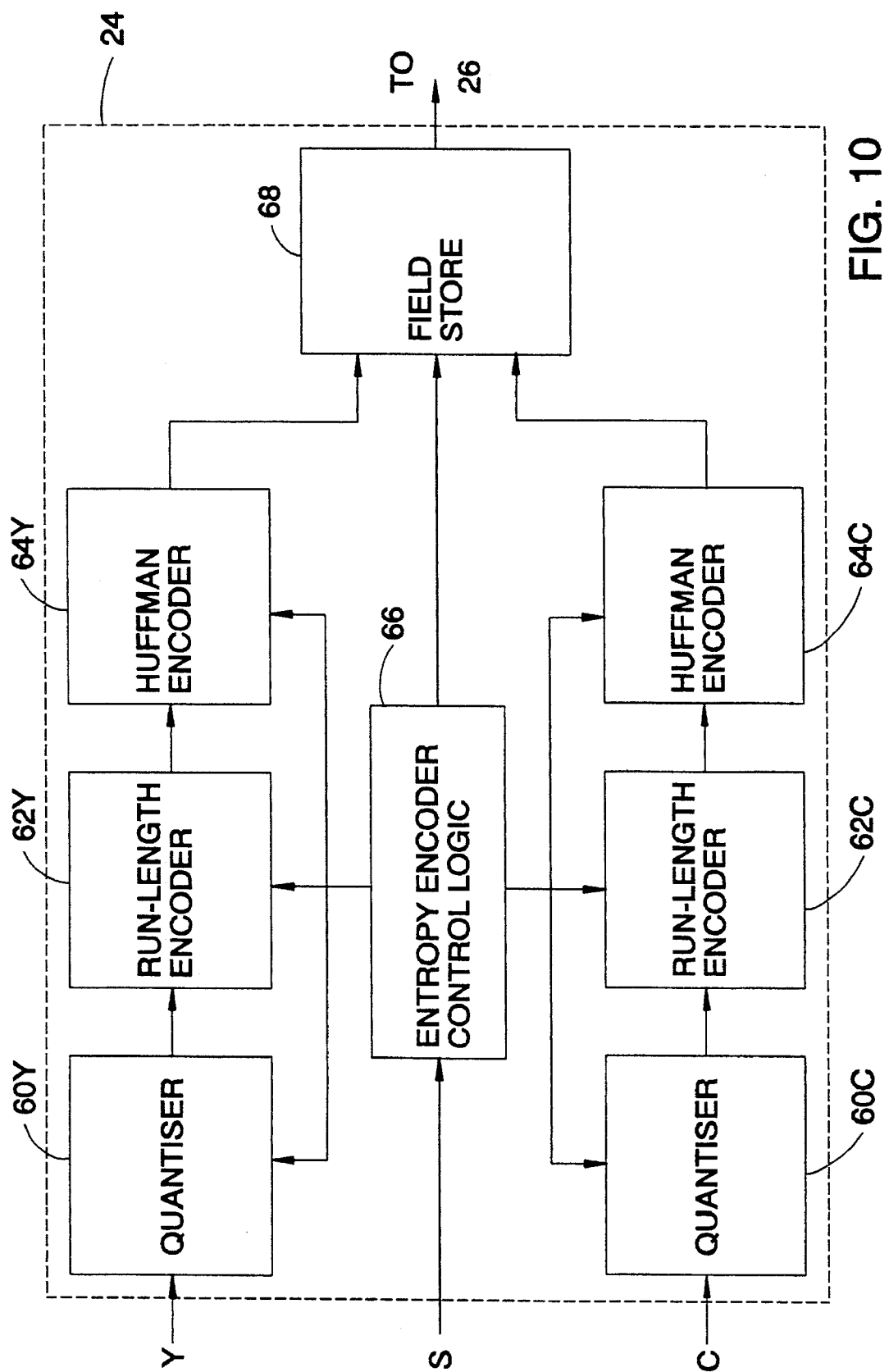
FIG. 10 is a schematic block diagram of an entropy encoder of the apparatus of FIG. 2.

FIG. 10 is a schematic block diagram of the entropy encoder 24 of FIG. 2. The entropy encoder comprises a quantiser, 60Y, a Fun-length encoder 62Y and a Huffman encoder 64Y for the luminance "Y" signals, also a quantiser, 60C, a run-length encoder 62C and a Huffman encoder 64C for the chrominance signals "C". Entropy encoder control logic 66 receives the signals "SB" from the sequencer 22 for controlling the operation of the quantisers 60, run-length encoders 62 and Huffman encoders 64. The entropy encoder also includes a field store 68 into which the outputs of both the Huffman encoder 64L for luminance signals and the Huffman encoder 64C for the chrominance signals are stored. The addressing of the field store 68 is also under the control of the entropy encoder control logic 66.

The quantisers 60Y/C quantise the data output from the decorrelator 20. In performing the quantising operation, the quantised levels to which the input data can be assigned are selected in accordance with the importance of the frequencies concerned to enable adequate perception of the image by the human psycho-visual system. Two benefits of the quantiser 24 are that it enables compression to be achieved by the reduction in the number of levels to which the data input to it can be assigned and also that it increases the probability of runs of zero value samples on the data it outputs.

The relative perceived importance of respective sub-pictures within the eight by eight array of sub-pictures stored in the field memories 58 varies. Accordingly, a quantisation matrix is provided in each quantiser 60 for applying different quantisation factors for the different sub-pictures in the field store 58. The signals "SB" from the sequencer 22, indicating the sub-band or sub-picture to which the data currently output from the field store 58 relates, permit the selection of an appropriate quantisation factor. The quantisation factors from the quantisation matrix can be multiplied by a scale factor for a video field before being applied to the signals output from the field store 58. Variation of the scale factor can be used to vary the output data (bit) rate of the entropy encoder 24 to keep the data rate (which can vary with image content) constant.

It should be noted that different quantisation matrices are required for the luminance and chrominance and the relative perceived importance of the sub-bands for the luminance and chrominance signals differs. The values for the quantisation matrices can be determined by a process of trial and error with subjective viewing tests to see which values give the best perceived image.

The quantised samples from the quantisers 60Y and 60C are passed to the run-length encoders 62Y and 62C, respectively in the order received by the quantisers. In other words, all the data from a first sub-band or sub-picture is sent to the run-length encoder 90 before any data from the next sub-band, with the data being time-multiplexed into the eight data processing channels mentioned earlier.

The run-length encoders 62Y and 62C produce run-length codes to represent runs of zeros terminated by a non-zero value (e.g. ...., 0,0,0,2, .....) and run-length codes representing runs of constant non-zero values (e.g. .... 2, 2, 2, 2 ...). In the interests of efficiency the run-length encoder 90 can be arranged such that it does not attempt to run-length code all possible runs. When a run or individual symbol has been identified by the run-length encoders 62Y or 62C, this is allocated an intermediate code. This intermediate code is passed to a respective Huffman encoder 64Y or 64C, respectively. The Huffman encoder 92 maps the intermediate code to a corresponding Huffman code. The Huffman encoding means that data items which are more likely produce shorter output bit sequences than data items which are less likely. The coding tables within the Huffman encoders 64 are PROMs whose memory locations are addressed by the intermediate code values and store the corresponding Huffman codes. The Huffman codes output from both of the Huffman encoders 64Y and 64C are passed to a field store 68 under the control of the entropy encoder control logic 66.

In an analogous manner to the way the run-length coding can be varied between sub-bands, the particular coding table applied by the Huffman encoders 64 can also be varied between sub-bands. This variation in coding table allows the Huffman coding to be more accurately matched to the nature of the data within each particular sub-band. Control over what types of runs are to be coded by the run-length encoders 62 and what coding table is to be used by the Huffman encoders 64 is achieved by the entropy encoder control logic 66 in response to the signals "SB" representing the current sub-picture or sub-band number from the sequencer 22.

An example of the operation of the entropy encoder for a particular run of data values, say 0,0,0,0,0, −2, can be summarised as follows. A run-length encoder 62 recognises the run of data values and assigns an intermediate code (IC). The corresponding Huffman encoder 64, which has a particular coding table for the current sub-band activated, maps the IC value to a Huffman code by using the IC value to reference the memory location with that address where the Huffman code, say 011011, is stored. The Huffman encoder 64 then outputs this Huffman code, 011011, representing the sequence of image data values 0,0,0,0,0, −2 for storage in the field store 68. A description of how Huffman codes can be allocated to appropriate events is given in the book entitled "Coding and Information Theory" by R W Hamming in Chapter 4, pages 64 to 68 (ISBN 0-13-139139-9).

Groups of sub-bands can be collected together and have the same run-length coding and Huffman coding applied to them without an undue loss of coding efficiency. This is particularly true for the higher frequency sub-bands where the nature of the type of data content remains roughly the same.

The data record processing apparatus can include an automatic quantisation function which enables the correct level of quantisation to be determined in order to achieve a desired degree of compression. This can be achieved by duplicating the quantisers, run-length encoders and Huffman decoders. The duplicated hardware is not shown in FIG. 10 for reasons of clarity of illustration. The duplicate quantisers are set to a fixed level so that different amounts of compression are to be expected. The outputs of the duplicate Huffman decoders are used to count the number of bits required to represent the data quantised with the fixed quantisation. The actual Huffman codes are not required for storage. The compression achieved with each fixed quantiser can then be mapped, in a PROM, to indicate the quantisation level that is required for the luminance "Y" and chrominance "C" quantisers 60Y, 60C in order to achieve the desired degree of compression. The entropy encoder control logic 66 is responsive to the output of the PROMS to set the quantisers 60Y, 60C at an appropriate level of quantisation by means of the selection of the appropriate scale factors as mentioned above.

Figure 12A:
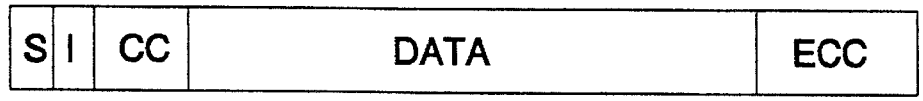
FIGS. 12A and 12B illustrate a data structure used for recording video data in the system of FIG. 1.

The output of the Huffman encoders 64 which, as a result of the automatic quantisation process is produced after a delay (e.g. a data processing channel or field period), is then stored in the field store 68 in blocks of constant length, in the present example 120 bytes, under the control of the entropy encoder control logic 66. The actual Huffman codes which are stored are of variable length, but they are assembled into the constant length blocks. Also blocks comprise both luminance and chrominance information. However although the chrominance and luminance information is representative of the same number of samples, as a result of different degrees of compression the proportion of chrominance and luminance data being stored in each block varies. Also, in view of the different degrees of compression achieved by the entropy encoder depending on the run-lengths encountered, each block may relate to different numbers of pixel samples. Accordingly, the control logic 66 of the entropy encoder 28 causes four bytes of compression coding header information to be added to each of the blocks. The header information identifies the sub-band to which the block relates and a start address indicating the address in the decorrelated image to which the first sample for the block relates. The header information also indicates the byte position within the block at which the chrominance information begins. FIG. 12A, to be described later, illustrates one of these blocks, which is termed an inner block.

Instead of the output of the Huffman decoders 64Y and 64C being stored directly in the field store 68, the output of each Huffman decoder could, for reasons of timing convenience, be stored in a respective output buffer (not shown) and then passed to the field store 68.

The output of the entropy encoder 24 as stored in the field store 68, is then accessed by the head channel encoder 26, which adds error correction data to the headers of the inner blocks to enable error correction to be performed after recording on the tape and distribution of the data processing channels between the heads.

Figure 11:
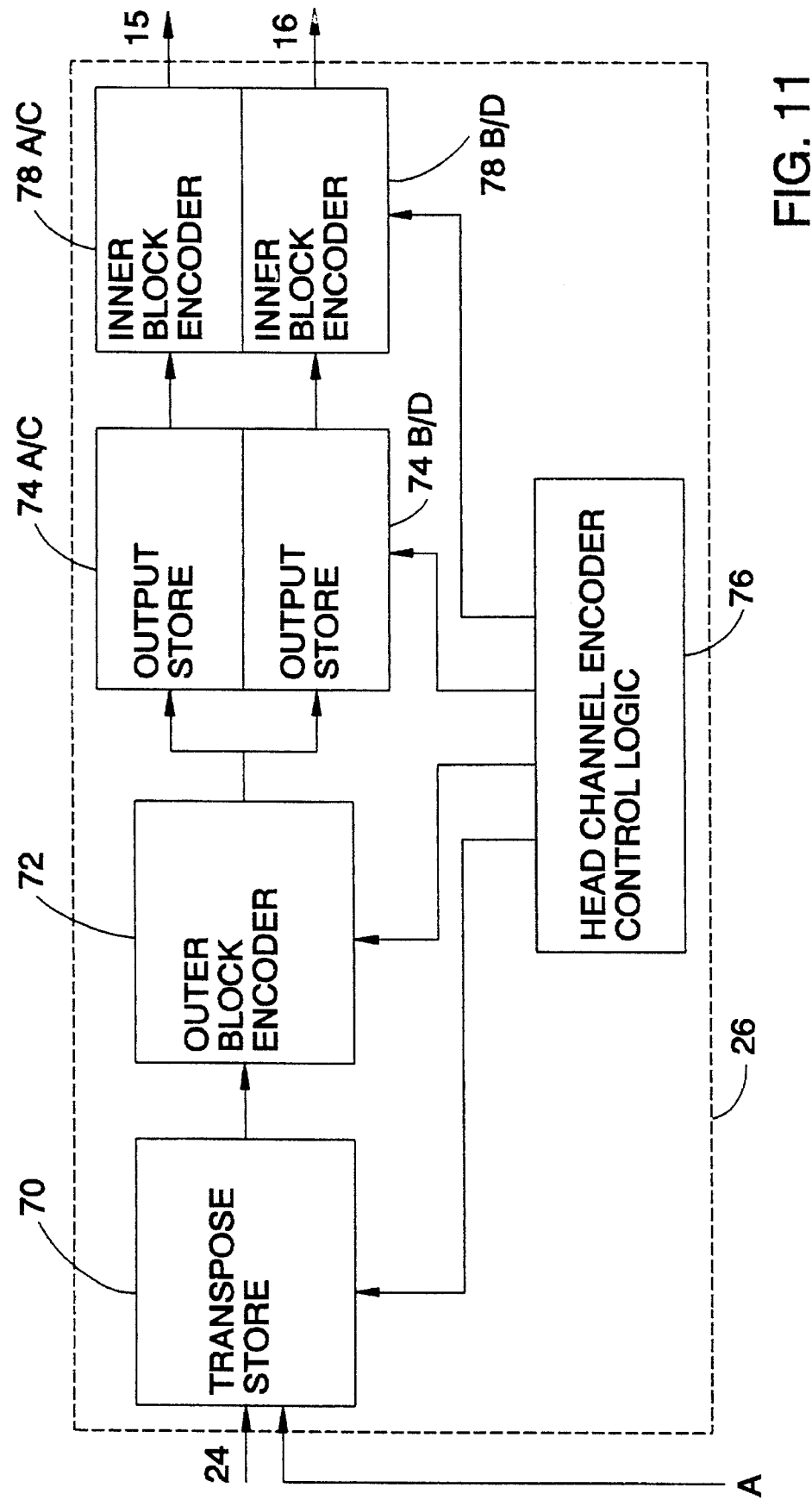
FIG. 11 is a schematic block diagram of a head channel encoder of the apparatus of FIG. 2.

FIG. 11 is a schematic block diagram of the head channel encoder 26. This comprises a transpose store 70, an outer block error correction encoder 72, first and second output stores 74 A/C and 74 B/D, head channel encoder control logic 76 and first and second inner block error correction encoders 78 A/C and 78 B/D. The inner block error encoder adds inner block correction data to each of the inner blocks from the field store 68 of the entropy encoder. It also adds a 2 byte synchronisation word and two bytes of block identification information. However, before it does this, the outer block encoder generates a further number of inner blocks which can be used to correct certain other inner blocks which could not be corrected by the inner block correction itself.

Figure 12B:
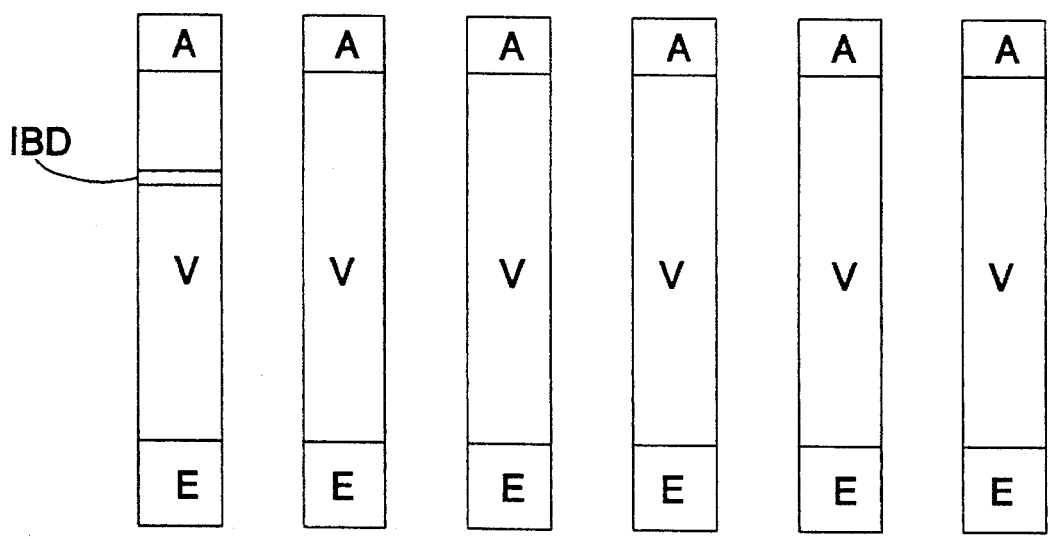

FIGS. 12A and 12B illustrate a block structure for the storage of digital data on tape. FIG. 12A is a schematic diagram showing the structure of one of the inner blocks mentioned above. Each inner block comprises the 2 bytes of synchronisation information ("S"), 2 bytes of inner block identification (ID) information ("I"), 4 bytes of compression coding header information ("CC"), 120 bytes of data ("DATA"), and 8 bytes of an error correcting code ("ECC"). FIG. 12B illustrates six so-called product blocks. Each of the product blocks is 124 bytes wide (i.e. the same size as the data field of an inner block). One inner block data field is represented with the reference IBD in the left hand product block shown in FIG. 9B. The video data from 38 inner data blocks is stored in the area labelled "V" in each of the product blocks. Also stored therein are 4 rows of audio inner blocks. A product block is completed through the provision of four 124 byte wide error correction codes in the area labelled "E". Each product block contains 124 byte-wide columns. One byte-wide column is termed an outer block.

Returning to FIG. 11, the operation of the head channel encoder 26 will now be described in more detail with reference to the block structure shown in FIGS. 12A and 12B. The video data inner blocks for one time slot (i.e. one data processing channel) from the field store 68 of the entropy encoder 24 are read into the transpose store 70 row by row from top to bottom (as shown in the product blocks in FIG. 12B) and within each row from left to right. The video data inner blocks comprise the video data and compression coding header information. Corresponding audio data inner blocks are also read into the transpose store row by row and within each row from left to right. This data is then read out of the transpose store 70 column by column from left to right and within each column from top to bottom. Reading the data in this transposed manner permits the outer block encoder to compute the error correction codes "E" shown in FIG. 12B for the columns (i.e. the outer blocks) of the video and audio data, "V" and "A", shown in FIG. 12B.

The output of the outer block error correction encoder during one time slot (i.e. for a data processing channel) is then stored in one of output stores 74 A/B or 74 B/D under the control of the head channel encoder control logic 76. One output store 74 A/B is used to contain the data for the first head channel 15 and the second output store 74 B/D is used to contain the data for the other of the head channels 16. The data is written into the output stores column by column from left to right (as represented in FIG. 12B) and within each column from top to bottom. The output stores are read so as to perform a further transpose function by reading the data row by row from top to bottom and within each row from left to right. Thus, when the data is read from the output stores 74 it is in the inner block format. The synchronisation "S", inner block ID "I" and the inner block error correction "ECC" information are added by the appropriate inner block encoder 78 A/B or 78 C/D. The completed inner blocks are supplied via the head channels 15 and 16 to the tape transport to be recorded on tape.

The error correction encoding processes performed by the inner and outer block encoders will not be described in further detail herein as the choice of a particular error encoding process is not required by the present invention. A conventional error correction encoding process such as one using Reed-Solomon codes can be used.

The inner block ID "I" identifies the inner block number, the video field, frame and frame pair number from an eight field sequence to which the inner data block relates and a head track and sub-track onto which the data is to be recorded as defined by the temporal demultiplexing sequence.

Before explaining the operation of the head channel encoder control logic 76, the tape transport mechanism and the storage of the blocks of data on tape will be described.

FIG. 13 is a schematic block diagram of a tape transport mechanism. FIG. 13 shows a helically scanned magnetic tape mechanism 80 in which magnetic tape 82 to be recorded or replayed is driven from a supply spool 84 to a take up spool 86 by a suitable drive motor (not shown). The supply spool 84 and the take up spool 86 may be housed within a tape cassette 88. The magnetic tape 82 from the supply spool 84 is guided by a guide roller 90 past a longitudinal record/replay head 92. The magnetic tape 82 then wraps around a rotary head drum 94, being guided by an entry guide roller 96 and an exit guide roller 98. When the magnetic tape 82 leaves the exit guide roller 98, it passes a second longitudinal record/replay head 30 and is then guided by a guide roller 102 onto the take up spool 86.

The arrangement by which the magnetic tape is wrapped around the rotary head drum 94 will be described in more detail with reference to FIG. 14. The rotary head drum 94 carries four magnetic record/replay heads A, B, C and D, arranged in pairs with each pair being disposed at 180° with respect to the other. Heads A and B form one pair of record/replay heads and heads C and D form the second pair of record/replay heads. When a recording is being made on the magnetic tape 82, the record/replay heads on the rotary head drum 94 are supplied with suitable electrical record signals by the record processing apparatus 14 ( see FIG. 1 ). The record processing apparatus supplies the record signals on two separate record head channels 108 and 110 (see FIG. 1): the first record head channel 15 is connected in common to heads A and C, whereby heads A and C form a first group of heads, and the second record head channel 16 is connected in common to heads B and D, whereby heads B and D form a second group of heads. Similarly first and second replay head channels 17 and 18 are connected to the first group of heads (A and C) and the second group of heads (B and D), respectively.

Figure 14:
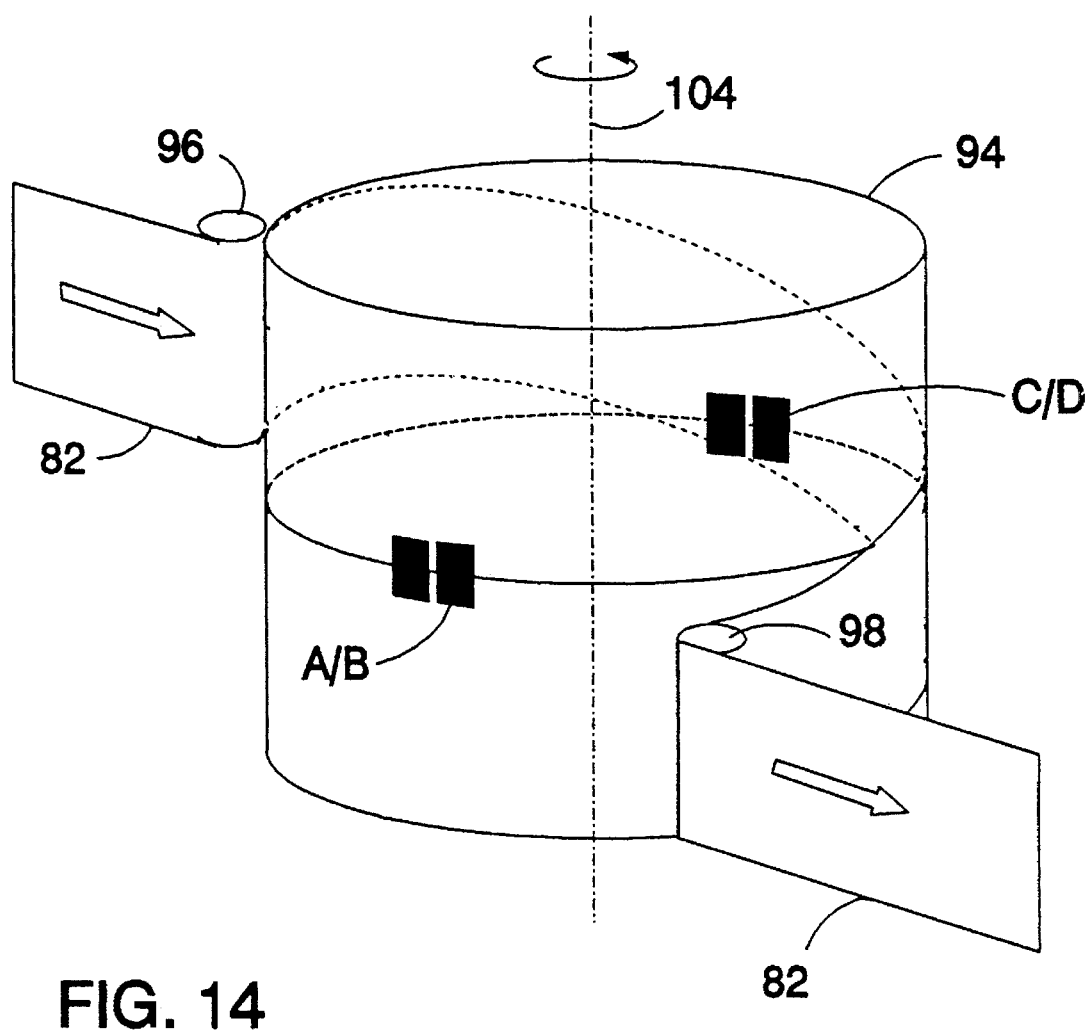
FIGS. 14, 15 and 16 are used to illustrate the recording of data on a tape in the system of FIG. 1.

FIG. 14 is a schematic diagram of a rotary head drum 94 for use in a tape recorder as shown in FIG. 13. In use, the rotary head drum 94 rotates about an axis of rotation 104 at the video field frequency. For example, therefore, for a 50 Hz video field frequency, the rotary head drum rotates about the axis of rotation 50 revolutions per second. The magnetic tape 82 is wrapped around the rotary head drum through an angle of about 180°. The magnetic tape is guided onto the rotary head drum by the entry guide roller 96 and is guided off the rotary head drum by the exit guide roller 98. The entry guide roller 96 is higher, in a direction parallel to the axis of rotation 104, than the exit guide roller 98. In this way, the magnetic tape 82 is guided in a gently descending spiral path around the periphery of the rotary head drum 94. The longitudinal speed of the magnetic tape 82 is such that during a single rotation of the rotary head drum 94, the tape advances by a distance which is very much smaller than the circumference of the rotary head drum 94. This arrangement means that data can be supplied alternately for head A and head C via a common head channel in respective time slots. The same applies for heads B and D.

Figure 15:
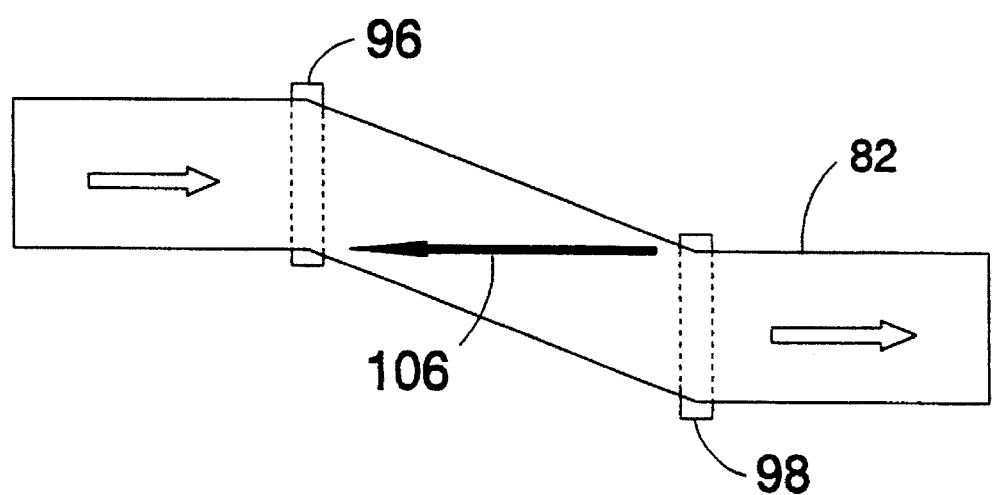
Figure 16:
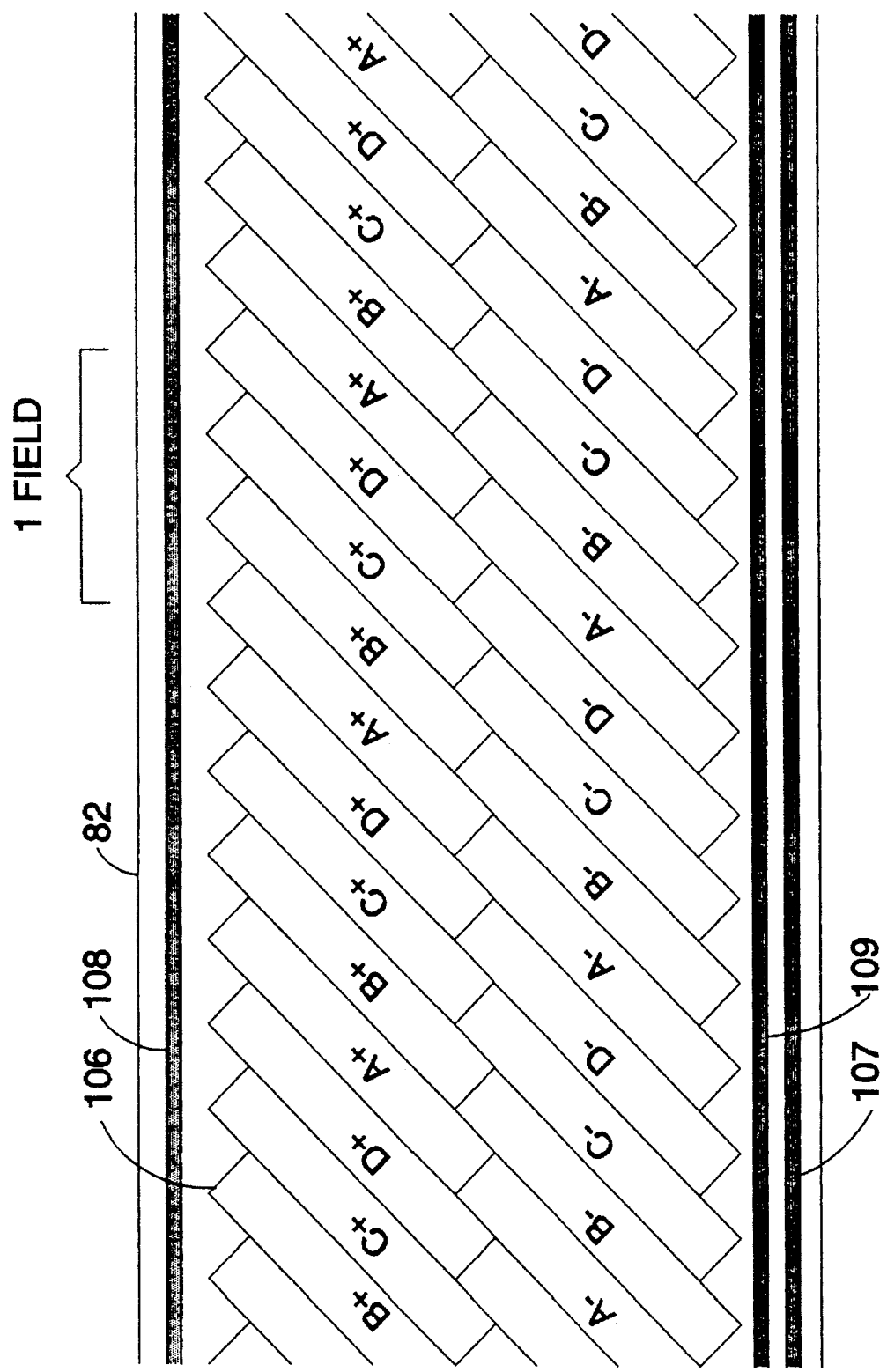

FIG. 15 illustrates the path on the magnetic tape followed by one head on the rotary head drum 94. The entry guide roller 96 is in a higher plane than the magnetic record/replay heads A, B, C, D which are in turn higher than the exit guide roller 98. The result this is that each head traces out a slanting oblique path (often termed a helical path) 48 on the tape. In FIG. 3 the angle of the path is exaggerated for clarity; in practice the oblique path 48 would be much longer than the width of the magnetic tape and would lie at an angle of about 4.5° to the edge of the tape. Because the tape is moving at a slow longitudinal tape speed the rotating magnetic record/replay heads A, B, C, D on the rotary head drum 94 form a succession of oblique record tracks 106 which are spaced longitudinally along the tape. FIG. 16 is a schematic representation of tracks recorded on the tape in an embodiment of the present invention showing the oblique tracks 106 on the tape. Successive tracks are recorded by the heads A, B, C and D respectively. In addition to the oblique tracks 106, a linear track 107 for time code information, a linear track 108 for analogue audio (audio cue) information and a further linear track 109 for further analogue audio information are provided by means of the linear record heads.

A group of four tracks contains the information for representing one field of video. Also the data in each of the upper or lower sub-tracks is representative of the whole image field as the data for each sub-track is derived from one of the spatial demultiplexed data processing channels. It can be seen that each of the tracks A, B, C, D, is labelled, respectively, A–, B–, C–, D– and in the upper area of the track A+, B+, C+, D+. The correspondence between the notation used here for the upper and lower portions of the tracks and in FIG. 9 is deliberate. In other words, the pixel data selected for channel A+, for example, is recorded in the area of the tape on the track labelled A+. The same applies for data selected for storage in, for example, data processing channel C– which is stored in its turn in the area of the tape labelled C–.

However it should be noted that the relationship of the data processing channels to the head sub-tracks (A+, A–, B+, B–, C+, C–, D+, D–) illustrated in FIG. 9 only applies to one of eight fields of input video. The allocation of the data processing channels 1 to 8 of FIG. 9 is changed every field of the eight field sequence by the control logic 76 of the head channel encoder 26 so as to temporally interleave the data processing channels among the heads as will be explained with reference to FIGS. 17 and 18.

Figure 17:
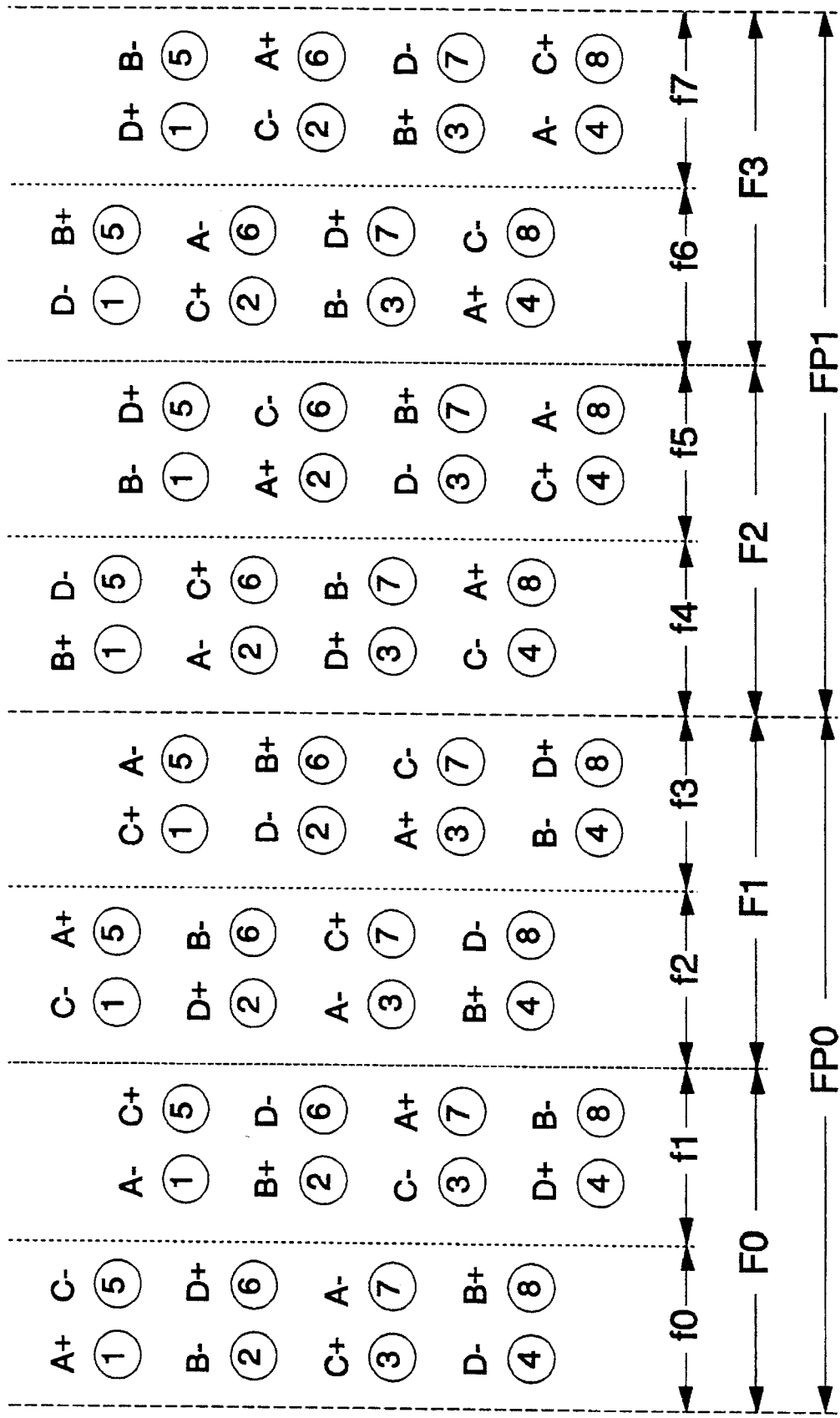
FIG. 17 is a schematic diagram illustrating a temporal demultiplexing performed by the head channel encoder of FIG. 11.

FIG. 17 illustrates the eight field head demultiplexing sequence controlled by the head channel encoder control logic 76. The vertical dashed lines separate the data for respective fields. The eight circles between pairs of dashed lines represent the eight spatially demultiplexed data processing channels (1–8). The letters A to D above the circles represent the allocation of the channels to the heads for respective fields. The "+" and "–" signs represent the upper and lower track portions (or sub-tracks) respectively (compare FIG. 6). At the bottom of FIG. 17, the field, frame and frame pair number are indicated. There are eight fields (F0–F7), four frames (F0–F4) and two frame pairs (FP0, FP1) in the eight field cycle. The sequence shown in FIG. 17 repeats every eight fields.

It will also be noted that the pattern of head channels in field zero of FIG. 17 corresponds to the top left hand block of eight pixels in FIG. 9. FIG. 9 illustrates the relationship between the spatial positions of the pixels within the decorrelated image and the eight data processing channels whereas FIG. 7 represents the allocation of the channels to the heads for successive fields. The relationship of the data processing channels to the head sub-tracks (A+, A–, B+, B–, C+, C–, D+, D–) illustrated in FIG. 9 only applies to one of eight fields of input video (i.e. field 0). The temporal demultiplexer 80 changes the mapping of the data processing channels to the heads and head tracks each field of video so as to temporally interleave the data processing channels among the heads. Thus, in an eight field sequence, each pixel will be allocated to each of the head sub-tracks in turn. The result of this is that the data for adjacent pixels can be distributed over the tape in a manner which enables efficient recovery from many of the types of errors which can occur in the recording of data on a video tape. Such errors include the failure of a particular head, for example due to a build up of dirt and/or material from the tape, scratches on the tape and so on.

Figure 18:
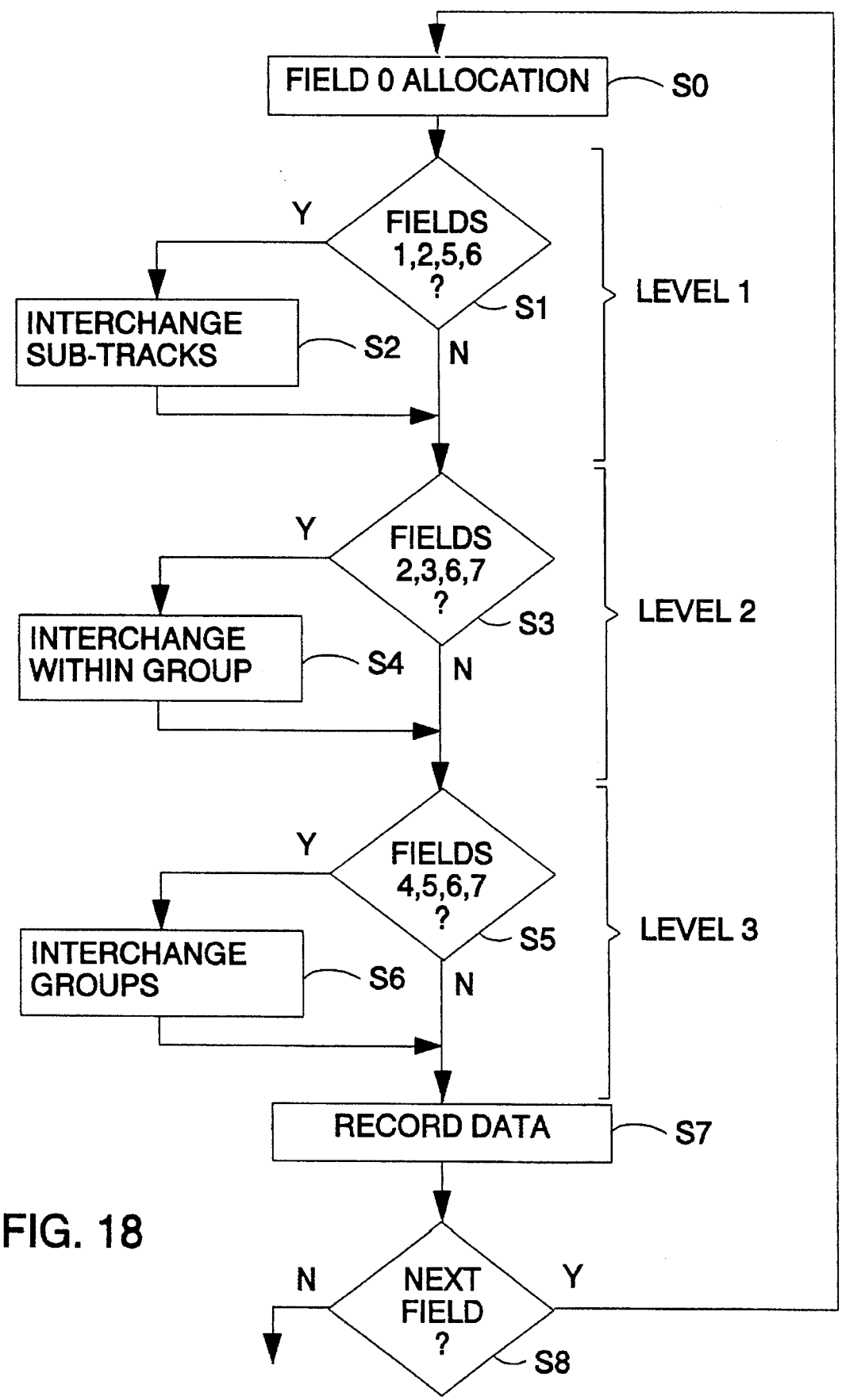
FIG. 18 is a flow diagram further illustrating the temporal demultiplexing.

FIG. 18 is a flow diagram representing the logic behind the operation of the head channel encoder controller 76 for generating the temporal head demultiplexing sequence, which has been arranged such that it can be reduced to a three level separable process with respect to time. The separation into three levels makes the process of demultiplexing and multiplexing easier to implement. The aim of the demultiplexing is to distribute data in a temporal manner between the heads such that more efficient concealment is possible on replay of the information from the tape. FIG. 18 explains how to arrive at the allocation of the data processing channels for each of the fields 1–7 in the eight field sequence with respect to the allocation for field 0.

For field f0 of FIG. 18 the eight separate data processing channels (0–7) are allocated to the upper (+) and lower (–) portions of the tape for the heads A, B, C and D as indicated in FIG. 9. This is represented by step S0 of FIG. 18.

For the first level of demultiplexing, if a current field in an eight field sequence is field f1, f2, f5 or f6 (step S2), then in step S3 the allocation of the data channels to the upper and lower track portions is interchanged. In other words, if in field f0 a channel is allocated to an upper portion of a track, then for fields 1, 2, 5 or 6 it is allocated to a lower portion of a track (and vice versa).

For the second level of demultiplexing, if a current field in the eight field sequence is field f2, f3, f6 or f7 (step S3), then the data processing channels are interchanged within a group of heads (step S4). In other words, if in field f0 a data processing channel is allocated to head A in fields f2, f3, f6 or f7, the data processing channel will be reallocated within a group to head C. Likewise head C will be switched to group A, head C to head D and head D to head B.

For the third stage of demultiplexing, if a current field in the eight-field sequence is field f4, f5, f6 or f7 (step S5), then the processing channel is switched between groups of heads in step S6. In other words, if in field f0 a data processing channel is allocated to heads A or C, it will be reallocated for fields f4, f5, f6 and f7 to heads B or D. Likewise an allocation to heads B or D is switched to heads A or C.

The data from the data processing channels is then recorded in step S7 in accordance with the allocation defined by steps S1 to S6 above. If another field is to be processed, step S8, then the process of allocation from the initial allocation is repeated.

In practice, this distribution of the data processing channels to the heads is achieved by selective addressing of the output stores 74 A/C and 74 B/D of the FIG. 11. The separation of the data for the head channels 15 and 16 (i.e. the third level demultiplexing for heads A/C and B/D respectively) is performed by writing the data to be recorded into the appropriate one of the output stores 74 A/C and 74 B/D. The separation of the data to the heads within a channel and the upper and lower portions of the head tracks (i.e. the first and second level demultiplexing into A+, A–; C+, C– for head channel 15 and B+, B–; D+, D– for head channel 16) is performed by selective reading from the output stores 74 A/C, 74 B/D by the head channel encoder control logic 76 in accordance with the logic represented in FIG. 18.

The temporal demultiplexing sequence is chosen to enable reliable correction or concealment of errors which can occur during the tape recording and replay process. The sequence has to take account of the various replay modes of the tape recorder. For example, it is important to avoid the generation of artifacts and other effects during, for example, shuttle replay at various speeds.

The replay signal processing apparatus of FIG. 3 will now be described.

Figure 19:
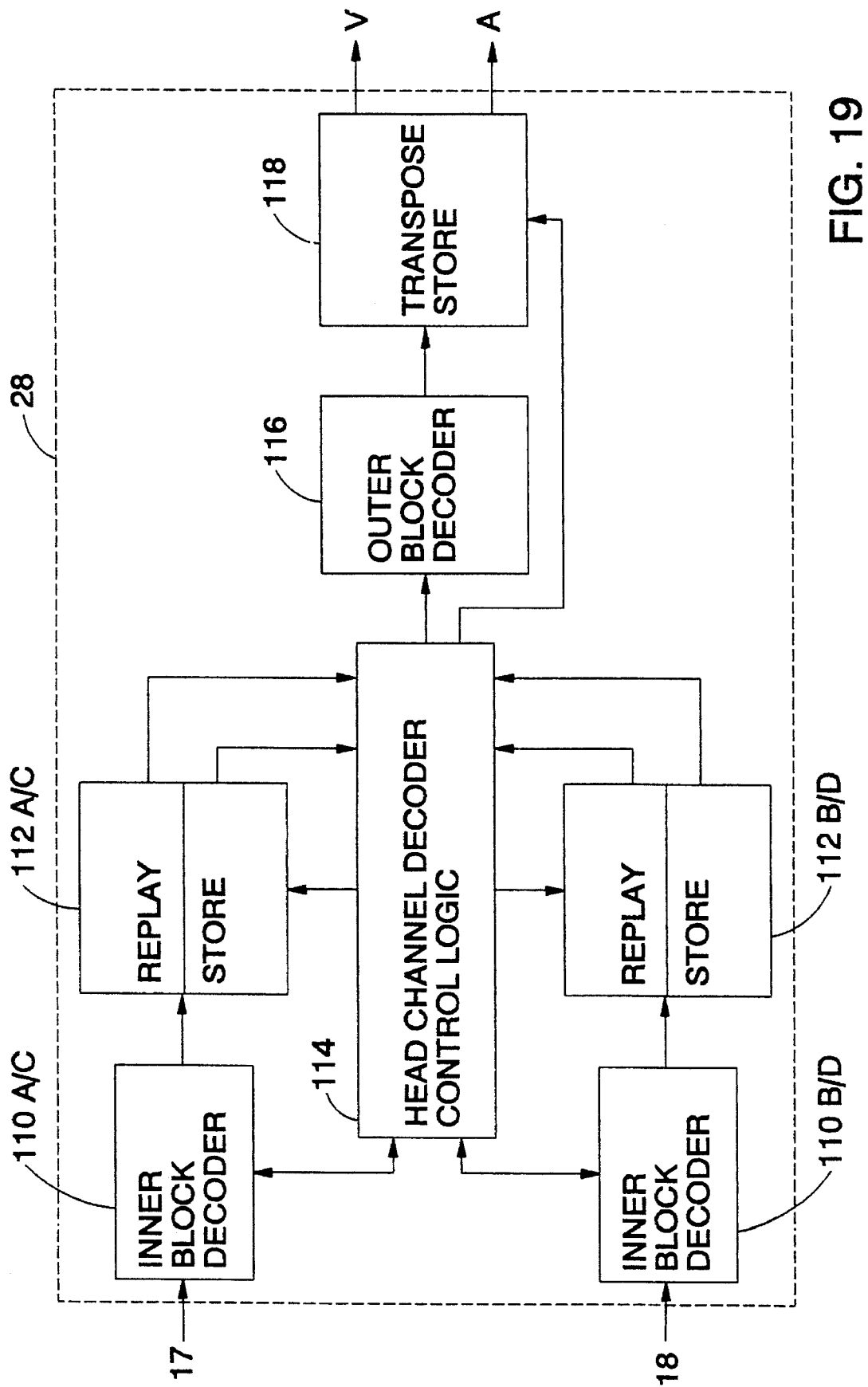
FIG. 19 is a schematic block diagram of a channel decoder of the apparatus of FIG. 3.

FIG. 19 is a schematic block diagram of the head channel decoder 28 of FIG. 3. The head channel decoder 28 performs the head multiplexing as a three stage or three level separable process. The three stages or levels of the separable process are represented in Table 1 to be found at the end of this description. In Table 1 the first level defines the allocation to the first or second portion of the track where "0" represents the same portion as for field f0 and "1" represents the other portion; the second level defines the allocation between the heads of a group (heads A and C form a first group, B and D a second group) and "0" represents an allocation the same head as for field f0 and "1" represents an allocation to the other head of a group; the third level defines the allocation between groups of heads (i.e. between group A/C and group B/D) and "0" represents an allocation to the same group as field f0 and "1" represents an allocation to the other group.

The head channel decoder receives the signals from the first group of heads, namely heads A and C, on the first head channel input 17 and the signals from the second group of heads, namely heads B and D, on the second head channel input 18.

The output from the heads A and C is supplied from the first input 17 to a first inner block decoder 110 A/C which separates out the synchronisation, address and error correction data from the inner blocks received from the heads A and C and performs the first and second level multiplexing from Table 1.

The inner block decoder 110 A/C extracts the synchronisation information "S" and the error correction codes "ECC" stored in the inner blocks and, where possible, uses the error correction codes to correct errors within the block. The actual process of error correction can be performed in a conventional manner using the error correction codes (e.g. Reed-Solomon correction codes mentioned above). Where, however, it is not possible to correct the errors for a given inner block with the error correction codes, the inner block decoder 110 A/C generates an error flag for that inner block.

The inner block decoder 110 also reads the inner block ID information "I", including the information about which head and track portion the block came from (A+, A−, B+, B− etc.) and information identifying the field, frame and frame pair from the eight field sequence to which the inner block relates. The inner block ID information is used to determine the location in a replay store 112 A/C at which the data from the first head channel 17 is stored. The selective storage of the inner blocks in the replay store 112 A/C in response to the inner block ID information implements the first and second stages, or levels, of multiplexing as represented in Table 1 (i.e. for the first head channel 17, multiplexing from the upper and lower track portions and the A and C heads).

The data from the second head replay channel 18 is processed in a similar manner by the second inner block decoder 110 B/D for storage in the replay store 112 B/D. The error correction codes "ECC" ape used, where possible to correct errors in the inner blocks. The inner block ID information "I" is used to determine the location in the replay store 112 B/D at which the data from the second head channel 18 is stored. The selective storage of the inner blocks in the replay store 112 B/D in response to the inner block ID information effectively performs the first and second stages or levels, of multiplexing as represented in Table 1 (i.e. for the second head channel 18, multiplexing from the upper and lower track portions and the B and D heads).

The replay store 112 comprising the replay stores 112 A/C and 112 B/D is in fact configured as four field stores so as provide the required buffer function for the replayed data in normal replay but also in slow and shuttle modes. In high speed modes, for example, the replay head continually cross tracks. Selective write addressing of the replay stores is controlled by head channel decoder control logic 114 in response to the synchronisation information "S" extracted by the inner block decoders 110 A/C and 110 B/D in order to ensure the correct storage of the data from the head channels.

The third stage of multiplexing as represented in Table 1 is performed by the head channel decoder control logic 114 by selective reading of the data from the replay store 112 synchronised with the output video rate. In order to correctly multiplex the data it is necessary to change the multiplex operation dependant on the frame number associated with the data being output. It will be remembered, with reference to FIG. 18, that the encoding or temporal demultiplexing between head channels, changes every other frame (i.e. for fields 0 and 4). Thus, in order to effect the third stage multiplexing, the head channel encoder control logic is responsive to data error flags and frame pair identity signals associated with inner blocks from the first and second replay stores 112 A/C and 112 B/D and, in addition to a head multiplex signal which is generated in synchronism with the output video rate. The head multiplex signal (Head MX) is not shown in FIG. 19, but is represented in Table 2 which can be found at the end of this description. The head multiplex signal in Table 2 indicates which of the head pair A and B and which of the head pair C or D is to be read for each frame pair.

Table 2 assumes that the frame ID is constant throughout any field and will normally be true for error free play. However, this is not the case in a shuttle mode of operation of a video tape recorder because data from all four frames in an eight field sequence can become mixed together. This can also happen in play mode if the error correction fails and concealment is required, since the previously stored data may not be from the same frame of the four frame (or eight field) sequence. Accordingly, the replay store read process is preferably performed on a sample-by-sample basis. The frame data may, therefore, change on a sample-by-sample basis and can be dynamically selected on this basis by the head multiplex signal of Table 2.

Accordingly, the head channel decoder control logic 114 selects data either from the first replay store 112 A/C or from the second replay store 112 B/D on the basis of five inputs (i.e. the error flag and the frame ID from the first and second replay stores and additionally the head Mx signal). Tables 3*a* and 3*b* to be found at the end of this description illustrate how the head channel multiplex control logic 114 responds to these five inputs (namely the head multiplex signal Head Mx, the frame pair number for the A/C head channel (FP A/C), the error flag for that channel (EF A/C), the frame pair number for the B/D head channel (FP B/D) and the error flag for that channel (EF B/D)) in columns 1–5 make the selection in the column 6 in order to provide the output in column 7. "1" in an error flag column indicates an error, "0" in an error flag column indicates no error. Note that the error flags "EF" and the frame pair IDs "FP" are labelled simply "F" and "I" respectively in FIG. 12 due to lack of space. The comments in column 9 indicate how potential conflicts which arise in the tables are resolved. Where the comment "don't care" is made, either buffer memory could be selected with no effect on the principle of operation. However, in such cases, the table indicates an arbitrary default choice. Table 3*a* is for the head multiplexing for the first replay store 112 A/C and table 3*b* is for the second replay store 112 B/D.

The data read from the replay store 112 is supplied to outer block decoder 116. As a result of the selective addressing of the replay stores 112 A/C and B/D the data is read on a data processing channel by data processing channel basis and within each data processing channel on a sub-band by sub-band basis in a time multiplexed manner. Thus the aim of the multiplexing operation, namely to reorder the temporally demultiplexed data from tape into the format of the zero field of FIG. 17 (i.e. to recreate the spatial distribution indicated in FIG. 9) is achieved.

Moreover, the data samples are output from the replay store 112 to the outer block decoder in the outer block order (i.e. in transposed order) by the head channel decoder control logic 114. Each outer block comprises 4 audio samples followed by 38 video samples followed by 4 outer correction samples. By reading the replay store in this way, excessive errors in an inner block are distributed. For example just one error would be flagged in each of six outer blocks if six successive inner blocks (i.e. one per product block) contained errors. The details of the outer block correction process are not described herein as the details thereof are not important to the invention. However, as it is possible to correct a number, say 4, samples, with conventional error correction processes (e.g. a Reed-Solomon process), it canbe seen that inner blocks which could not be corrected with the inner block correction codes "ECC" can be corrected with the outer block correction codes "E".

The output of the outer block decoder 116 is supplied to a transpose store 118. The data is written into the transpose store in outer block order and can be read from the transpose store in inner block order, thereby reformatting the inner blocks. If an inner block remains uncorrected after the outer block error correction process, the error flag remains set for that inner block.

The head channel decoder control logic controls the read addressing of the transpose store 118. Audio data is supplied to output A. The video data is supplied to the entropy decoder 30 data processing channel by data processing channel and with each data processing channel on a sub-band by sub-band basis in a time multiplexed manner.

Figure 20:
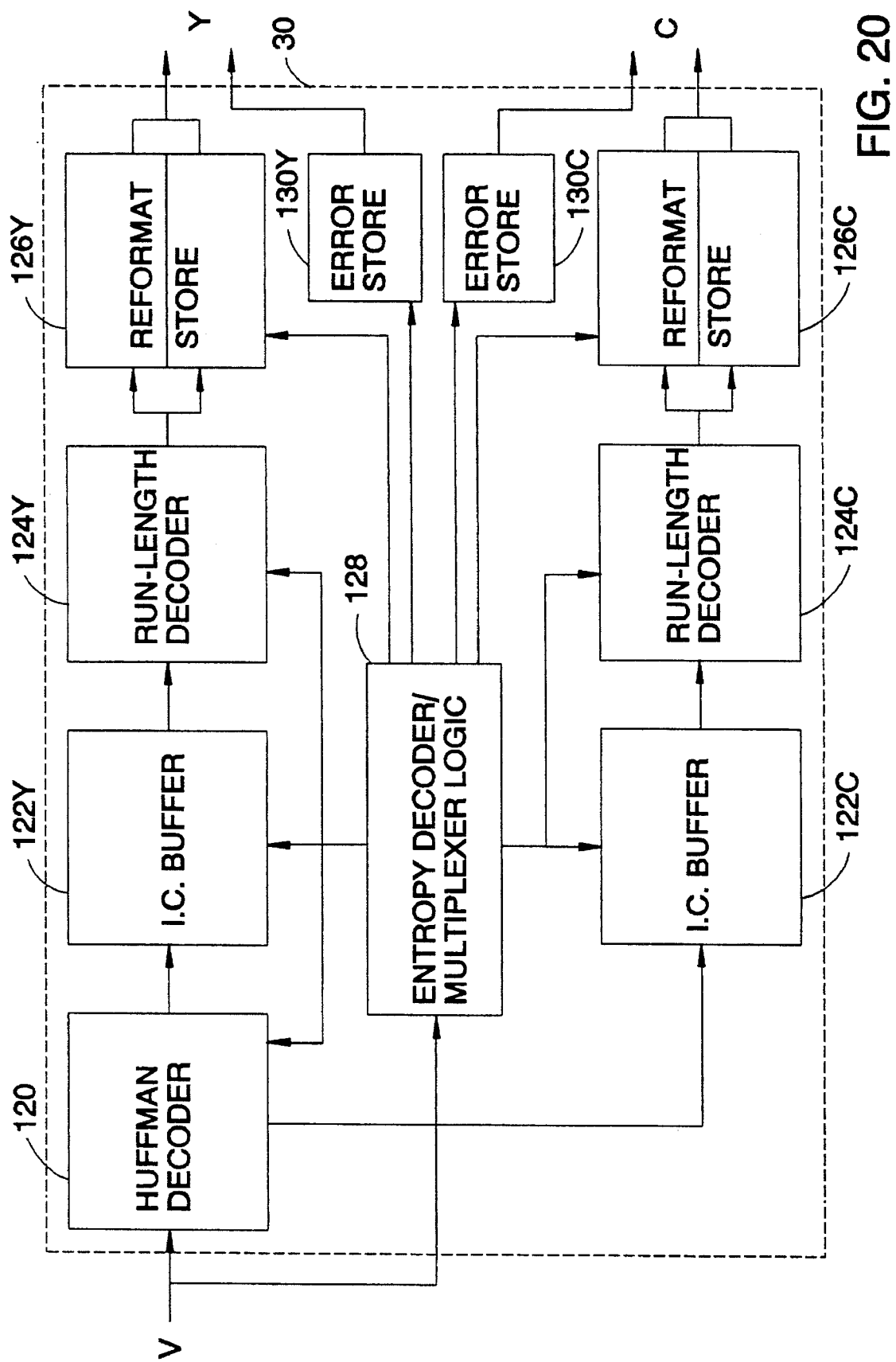
FIG. 20 is a schematic block diagram of an entropy decoder of the apparatus of FIG. 3.

FIG. 20 is a schematic block diagram of the entropy decoder 30. Compressed samples from the head channel decoder are supplied to a Huffman decoder 120 which maps the Huffman encoded data into intermediate codes. The intermediate codes (IC) luminance "Y" and chrominance "C" signals are separated in accordance with the data stored in the compression coding header information "CC" and are stored in luminance and chrominance IC buffers 122Y, 122C, respectively. If an inner block is flagged as being in error by the head channel decoder 28, then the ICs for that block are not produced and consequently not stored in the IC buffer for that block. On reading the IC buffers, the ICs are supplied to a respective run-length decoder 124Y, 124C. The run-length decoders convert the ICs into their corresponding runs and individual values. As with the entropy encoder, different tables are used for different sub-bands. Entropy decoder/multiplexer logic 128 controls the selection of different decoding tables in the Huffman decoders 120Y, 120C and the run-length decoders 124Y, 124C in response to the sub-band information contained in the compression coding header information which it extracts from the inner blocks from the transpose store 118.

The expanded data produced by each run-length decoder 124Y, 124C is written into a respective reformatter store 126Y and 126C. The entropy decoder/multiplexer logic 128 determines addresses in the reformatter stores 126Y, 126C in response to the start address information contained in the compression code header information for the block concerned. It will be remembered that the start address indicates the location in the decorrelated image to which the first sample in the block relates. The start address is incremented each time a further sample from the run-length encoder is written to the memory. The use of the start address allows the correct position in the reformatter store to be identified even when the sequence of inner blocks is interrupted by an erroneous inner block.

The selective addressing of the reformatter store by the entropy decoder/multiplexer logic 128 enables the eight data processing channels to be spatially multiplexed or spatially de-interleaved. The logic 128 thus performs the inverse of the demultiplexing function performed by the sequencer 22.

The reformatter stores 126Y and 126C are each implemented as dual buffers such that data canbe written to one buffer while data is read from the other on an alternating basis. In this way, all odd fields are written to one buffer in each of the reformatter stores 126Y and 126C and the even fields are written to the other buffer in each of the reformatter stores 126Y and 126C.

If an inner block is in error, then the corresponding part of the appropriate reformatter store 126Y or 126C is not written. The data from a previous frame is therefore available in that part of the reformatter store. This feature can provide a rough form of temporal error concealment.

The entropy decoder also includes two error stores 130Y and 130C. The error stores are written to in parallel with writing to the reformatter stores 126Y and 126C. Each time a sample location in a reformatter store is written, a first value is written to the corresponding location in the corresponding error store. Every time a sample location is read from a reformatter store a second value is written into the corresponding location in the corresponding error store. By doing this, for any location in the reformatter store not written to during a field period, the corresponding location in the corresponding reformatter store will contain the second value. By reading the locations in the error stores, it is possible for the concealment logic 32 illustrated in FIG. 3 to determine whether a value needs to be concealed.

Accordingly, when the data for a complete field has been written to the reformatter stores 126Y and 126C, the concealment logic for the corresponding luminance "Y" and chrominance "C" hardware channels processes the content of the reformatter stores 126Y and 126C, respectively, and the error stores 130Y and 130C, respectively to carry out concealment processing. The data is processed in the order appropriate for supply to the interpolators 34Y and 34C. In other words, the data is processed in the same sub-picture format as generated by the decorrelators 20Y and 20C.

The concealment logic 32Y or 32C can conceal samples from the reformatter stores 126Y or 126C, respectively, for which there is a second value at a corresponding location in the corresponding error store 130Y or 130C, respectively, in a number of ways. This can be achieved by interpolating adjacent pixels in the same field (this is the preferred approach when there is movement in the video images) or pixels at corresponding positions in preceding or subsequent fields or frames. The details of the concealment processor are not described in detail herein as a specific concealment technique is not essential to the present invention. Concealment could be performed using conventional techniques as outlined in GB-A 2 140 189 mentioned previously. As is the case with GB-A 2 140 189, the distribution of video data between the heads for recording enables concealment of pixel data due to head loss to be performed. However, in GB-A 2 140 189 the data was not decorrelated and compressed. With the separation of the video data into twice the number of data processing channels as there are heads as in the present apparatus, with each channel being allocated to a head for half the time it takes to lay a track, and cycling the allocation of the data processing channels to each of the half tracks over an eight field sequence, it is possible to also conceal data if an error such as a scratch on one half of the tape means that no data is recovered from that half of the tape. Other concealment techniques which could be used are described in co-pending UK patent application 9200433.2, corresponding to U.S. application Ser. No. 07/977,251, which is incorporated herein by reference.

If interpolated concealment is not possible (e.g. due to a very high error rate), then the sample stored in a reformatter store for a previous frame (i.e. where no overwriting occurred) could be used to provide the rough form of temporal concealment as mentioned above.

The output of each concealment processor 32Y and 32C is passed to a corresponding interpolator 34Y and 34C, respectively. The interpolators receive the data in the same sub-picture format as generated by the decorrelators 20Y and 20C. The structure of the interpolators mirrors that of the decorrelators 20Y and 20C, having vertical and horizontal interpolation stages, with an intermediate field store with transpose addressing logic. Each of the vertical and horizontal stages comprises a tree shaped structure corresponding to the right side of the dashed line 40. The output of the interpolators 34Y and 34C reproduce the luminance "Y" and chrominance "C" signals supplied from the I/O apparatus 13 to the record processing apparatus 14.

There has been described an example of a digital video tape recording/playback system having a plurality of recording heads on a rotating head mechanism for recording slanting tracks which extend diagonally across the tape. The system provides for the processing of video signals in a plurality of data processing channels with selective connection of the data processing channels to the recording heads such that data from a plurality of data processing channels are stored in respective portions of a slanting track. Preferably, two data processing channels are recorded on each track, the respective portions being located in upper and lower portions of the tape, respectively.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

TABLE 1

| Field No: | 0 | 1 | 2 | 3 | 4 | 5 | 6 | 7 |
|---|---|---|---|---|---|---|---|---|
| Upper/Lower (U = 0, L = 1) | 0 | 1 | 1 | 0 | 0 | 1 | 1 | 0 |
| A<>C, B<>D (A/B = 0, C/D = 1) | 0 | 0 | 1 | 1 | 0 | 0 | 1 | 1 |
| A<>B, C<>D (A/C = 0, B/D = 1) | 0 | 0 | 0 | 0 | 1 | 1 | 1 | 1 |

TABLE 2

| Head Mx | FP 0 | FP 1 |
|---|---|---|
| 0 | A/C | B/D |
| 1 | B/D | A/C |

TABLE 3a

| Head Mx | FP A/C | EF A/C | FP B/D | EF B/D | Select | EF Out | Comments |
|---|---|---|---|---|---|---|---|
| 0 | 0 | 0 | 0 | 0 | 0 A/C | 0 | |
| 0 | 0 | 0 | 0 | 1 | 0 A/C | 0 | |
| 0 | 0 | 0 | 1 | 0 | 0 A/C | 0 | Don't care-default A/C |
| 0 | 0 | 0 | 1 | 1 | 0 A/C | 0 | |
| 0 | 0 | 1 | 0 | 0 | 0 A/C | 1 | |
| 0 | 0 | 1 | 0 | 1 | 0 A/C | 1 | Don't care- |

TABLE 3a-continued

| Head Mx | FP A/C | EF A/C | FP B/D | EF B/D | Select | EF Out | Comments |
|---|---|---|---|---|---|---|---|
| 0 | 0 | 1 | 1 | 0 | 1 B/D | 0 | default A/C |
| 0 | 0 | 1 | 1 | 1 | 0 A/C | 1 | Don't care-default A/C |
| 0 | 1 | 0 | 0 | 0 | 0 A/C | 0 | Conflict-default A/C |
| 0 | 1 | 0 | 0 | 1 | 1 B/D | 0 | |
| 0 | 1 | 0 | 1 | 0 | 1 B/D | 0 | |
| 0 | 1 | 0 | 1 | 1 | 1 B/D | 1 | |
| 0 | 1 | 1 | 0 | 0 | 0 A/C | 1 | |
| 0 | 1 | 1 | 0 | 1 | 0 A/C | 1 | Don't care-default A/C |
| 0 | 1 | 1 | 1 | 0 | 1 B/D | 0 | |
| 0 | 1 | 1 | 1 | 1 | 1 B/D | 1 | |

TABLE 3b

| Head Mx | FP A/C | EF A/C | FP B/D | EF B/D | Select | EF Out | Comments |
|---|---|---|---|---|---|---|---|
| 1 | 0 | 0 | 0 | 0 | 1 B/D | 0 | |
| 1 | 0 | 0 | 0 | 1 | 1 B/D | 1 | |
| 1 | 0 | 0 | 1 | 0 | 1 B/D | 1 | Conflict-default B/D |
| 1 | 0 | 0 | 1 | 1 | 1 B/D | 1 | |
| 1 | 0 | 1 | 0 | 0 | 1 B/D | 0 | |
| 1 | 0 | 1 | 0 | 1 | 1 B/D | 1 | Don't care-default B/D |
| 1 | 0 | 1 | 1 | 0 | 0 A/C | 1 | |
| 1 | 0 | 1 | 1 | 1 | 1 B/D | 1 | Don't care-default B/D |
| 1 | 1 | 0 | 0 | 0 | 1 B/D | 0 | Don't care-default B/D |
| 1 | 1 | 0 | 0 | 1 | 0 A/C | 0 | |
| 1 | 1 | 0 | 1 | 0 | 0 A/C | 0 | |
| 1 | 1 | 0 | 1 | 1 | 0 A/C | 0 | |
| 1 | 1 | 1 | 0 | 0 | 1 B/D | 0 | |
| 1 | 1 | 1 | 0 | 1 | 1 B/D | 1 | Don't care-default B/D |
| 1 | 1 | 1 | 1 | 0 | 0 A/C | 1 | |
| 1 | 1 | 1 | 1 | 1 | 0 A/C | 1 | |

We claim:

1. Record signal processing apparatus for a digital recorder, comprising:

a rotating head mechanism having n recording heads for recording slanting tracks which extend diagonally across a recording medium;

means for receiving input fields of digital signals;

means for demultiplexing signals from each field of said input fields into 2*n data processing channels such that each data processing channel includes data representing portions of said digital signals that are substantially evenly distributed over said each field; and means for selectively allocating said data from said data processing channels to head channels for said recording heads and for reallocating said data processing channels to different ones of said head channels in successive fields of said input fields such that, in use, data from two of said data processing channels are recorded in first and second respective portions of one of said slanting tracks.

2. Apparatus as claimed in claim 1 wherein said first and second portions of the slanting track are located in upper and lower portions of the recording medium, respectively.

3. Apparatus as claimed in claim 1 where n is 4.

4. Apparatus as claimed in claim 1 wherein said digital signals are image signals and wherein data for a field of said input fields of digital signals is stored in four tracks on said recording medium.

5. Apparatus as claimed in claim 1 wherein the allocating means supplies blocks for first and second data channels to one of said recording heads at respective timings whereby the blocks for said first and second data channels are recorded in first and second portions of said recording medium respectively.

6. Apparatus as claimed in claim 1 wherein the allocating means is operative to reallocate said data from said data processing channels to the heads for successive fields in a repeating multi-field sequence.

7. Apparatus as claimed in claim 1, wherein said input fields are fields of video signals and further comprising decorrelation means for decorrelating each of said input fields of said video signals to generate a respective field of decorrelated video signals, the demultiplexing means being connected to said decorrelation means whereby said demultiplexing means demultiplexes said field of decorrelated video signals into said plurality of data processing channels such that each data processing channel includes portions of said decorrelated video signals that are substantially evenly distributed over said field of decorrelated video signals.

8. Apparatus as claimed in claim 7 wherein said digital video signals are recorded in compressed form on said recording medium, said apparatus further comprising compression means connected to said decorrelation means for compressing said decorrelated video signals.

9. Apparatus as claimed in claim 8 wherein said compression means comprises means for quantising the decorrelated video signals to form quantised signals and entropy encoding means for entropy encoding said quantised signals.

10. Apparatus as claimed in claim 9 wherein said entropy encoding means comprises means for performing run-length encoding of said quantised signals to form run-length encoded data and Huffman encoding means for further encoding said run-length encoded data using Huffman codes.

11. Apparatus as claimed in claim 9 wherein said entropy encoding means is operative to format said compressed data into equally sized blocks and to append block coding information to each block for subsequent decoding of the content thereof, and to append address information for locating each block within said field of decorrelated video signals before its compression.

12. Apparatus as claimed in claim 11 wherein said digital signals comprise luminance and chrominance signals and wherein separate hardware channels are provided for processing said luminance and chrominance signals and wherein said entropy encoding means comprises means for combining luminance and chrominance data in each block.

13. Apparatus as claimed in claim 11, further comprising error correction encoding means for applying error correction codes to said blocks of data, said error correction encoding means processing a plurality of blocks as an array of blocks and deriving error correction codes for each of two dimensions of said array.

14. Apparatus as claimed in claim 13 wherein said error correction encoding means and the allocating means form part of a head channel encoding means, said head channel encoding means operative to apply synchronisation signals and block identification codes to blocks prior to the recording thereof.

15. Apparatus as claimed in claim 7 wherein said data processing channels are processed in a time multiplexed manner on common hardware.

16. Replay processing apparatus for a digital player, comprising:

a rotating head mechanism having n playback heads for replaying a recording medium having slanting tracks which extend diagonally across said recording medium and contain data that represent fields of digital signals and are substantially evenly distributed from said fields into 2*n data processing channels such that the data from two of said data processing channels are recorded in first and second respective portions of one of said slanting tracks;

at least one head channel connected, in use, to said playback heads;

channel decoding means for processing the data from said data processing channels replayed from a plurality of portions of each of said slanting tracks by said playback heads and received from said at least one head channel, and for allocating said data processing channels to different ones of said at least one head channel in successive fields; and means for multiplexing data from said data processing channels to generate said successive fields of said digital signals such that the data replayed from each of said portions of each of said slanting tracks is evenly distributed over one of the generated successive fields.

17. Apparatus as claimed in claim 16 wherein said data are recorded on said slanting tracks in groups of blocks, each block of said groups of blocks having error correcting information associated therewith and wherein said channel decoding means is operative to effect error correction, where possible, for each block of said groups of blocks using said error correcting information associated therewith and is operative to generate an error signal for said each block where error correction for that block is unsuccessful.

18. Apparatus as claimed in claim 17 wherein said each block of said groups of blocks recorded on said slanting tracks is associated with block identification information uniquely identifying said each block and wherein said channel decoding means comprises replay storage means for storing the replayed data of said groups of blocks, means responsive to said block identification information for said each block for addressing locations in said replay storage for storage of the replayed data for that block and temporal multiplexing logic means for selecting data for a respective one of said data processing channels from the replay storage means.

19. Apparatus as claimed in claim 18 wherein said replay storage means is operative to omit storing the replayed data for said each block for which an error signal is generated by said channel decoding means.

20. Apparatus as claimed in claim 19 wherein said each block of said groups of blocks recorded on said slanting tracks has coding information and address information associated therewith and further comprising means for decompressing said each block for which said channel decoding means effected error correction using said coding information associated with that block to form decompressed data and for storing said decompressed data for said each block in at least one buffer means using said address information associated with said each block.

21. Apparatus as claimed in claim 20 wherein said means for decompressing is operative to omit storing said decompressed data in said at least one buffer means for said each data block for which an error signal is generated by said channel decoding means and wherein said means for decompressing includes means for monitoring when data is stored in said buffer means.

22. Apparatus as claimed in claim 21 further comprising concealment means responsive to said monitoring means for generating a concealing data block corresponding to said each data block for which an error signal is generated as a function of data in the data blocks surrounding said each data block.

23. Apparatus as claimed in claim 16, further comprising means connected to said channel decoding means for decompressing the replayed data from said data processing channels to form decompressed data and for subsequently merging said decompressed data from said data processing channels.

24. Apparatus as claimed in claim 16 wherein said data contained in said slanting tracks is representative of image or video signals comprising chrominance and luminance signals and wherein said chrominance and luminance signals are separated from the replayed data and processed by separate hardware channels.

25. Digital video processing apparatus comprising:
   n recording heads on a rotating head mechanism for recording slanting tracks which extend diagonally across a recording medium;
   a record processing apparatus including means for receiving input fields of digital signals; means for demultiplexing signals from each field of said input fields into 2*n data processing channels such that each data processing channel includes data representing portions of said digital signals that are substantially evenly distributed over said each field; and means for selectively allocating said data from said data processing channels to head channels for said recording heads and for reallocating said data processing channels to different ones of said head channels in successive fields of said input fields such that, in use, data from two of said data processing channels are recorded in first and second respective portions of one of said slanting tracks; and
   a replay processing apparatus including at least one head channel connected, in use, to said playback heads; channel decoding means for processing the data from said data processing channels replayed from a plurality of portions of each of said slanting tracks by said playback heads and received from said at least one head channel; and means for multiplexing data from said data processing channels to generate said input fields of digital signals such that the data replayed from each of said portions of each of said slanting tracks is evenly distributed over one of the generated input fields.

26. An apparatus as claimed in claim 25 wherein said recording medium is a tape and further comprising tape transport means including a plurality of playback heads on said rotating head mechanism for replaying said tape.

* * * * *